United States Patent [19]
Hunsinger et al.

[11] Patent Number: 5,956,624
[45] Date of Patent: Sep. 21, 1999

[54] METHOD AND SYSTEM FOR SIMULTANEOUSLY BROADCASTING AND RECEIVING DIGITAL AND ANALOG SIGNALS

[75] Inventors: Bill J. Hunsinger, Urbana; Derek D. Kumar, Champaigne, both of Ill.

[73] Assignee: USA Digital Radio Partners LP, Columbia, Md.

[21] Appl. No.: 08/274,140

[22] Filed: Jul. 12, 1994

[51] Int. Cl.$^6$ ............................................... H04B 7/26
[52] U.S. Cl. ........................................... 455/65; 375/285
[58] Field of Search ................................... 375/216, 285, 375/296, 260, 315, 205, 206; 455/63, 65, 67.1, 67.3, 59, 60, 61, 102, 103, 104, 105, 46, 6.3; 370/208, 342

[56] References Cited

U.S. PATENT DOCUMENTS

| | | | |
|---|---|---|---|
| 3,204,035 | 8/1965 | Ballard et al. ............................. | 370/21 |
| 4,228,517 | 10/1980 | Constant . | |
| 4,238,849 | 12/1980 | Gassmann . | |
| 4,281,217 | 7/1981 | Dolby ........................................ | 455/70 |
| 4,379,947 | 4/1983 | Warner . | |
| 4,403,331 | 9/1983 | Halpern et al. . | |
| 4,476,573 | 10/1984 | Duckeck ................................... | 455/45 |
| 4,498,195 | 2/1985 | Ooi et al. .................................. | 455/295 |
| 4,621,355 | 11/1986 | Hirosaki et al. . | |
| 4,633,285 | 12/1986 | Hunsinger et al. . | |
| 4,658,296 | 4/1987 | Beech ........................................ | 455/43 |
| 4,660,192 | 4/1987 | Pomatto, Sr. ............................. | 455/61 |
| 4,712,240 | 12/1987 | Schnerk . | |
| 5,038,402 | 8/1991 | Robbins ................................... | 455/6.3 |
| 5,073,898 | 12/1991 | Endo et al. ............................... | 375/205 |
| 5,103,459 | 4/1992 | Gilhousen et al. ...................... | 375/205 |
| 5,121,211 | 6/1992 | Koo .......................................... | 455/65 |
| 5,121,407 | 6/1992 | Partyka et al. .......................... | 375/205 |
| 5,133,081 | 7/1992 | Mayo ....................................... | 455/18 |
| 5,136,611 | 8/1992 | Kirimoto et al. ....................... | 375/205 |
| 5,150,377 | 9/1992 | Vannucci ................................. | 375/205 |
| 5,164,959 | 11/1992 | Cai et al. ................................. | 375/205 |
| 5,175,710 | 12/1992 | Hutson . | |
| 5,202,900 | 4/1993 | Leitch ...................................... | 375/285 |
| 5,210,770 | 5/1993 | Rice ......................................... | 375/205 |
| 5,216,693 | 6/1993 | Nakamura ............................... | 375/205 |
| 5,218,717 | 6/1993 | Reitberger .............................. | 455/51.2 |
| 5,222,101 | 6/1993 | Ariyavisitakul el al. . | |

(List continued on next page.)

FOREIGN PATENT DOCUMENTS

| | | |
|---|---|---|
| 0279349 | 8/1988 | European Pat. Off. . |
| 0436875 | 7/1991 | European Pat. Off. . |
| 695353 | 8/1953 | United Kingdom . |
| 7900718 | 10/1979 | WIPO . |
| 8302533 | 7/1983 | WIPO . |
| 8803342 | 5/1988 | WIPO . |
| 9219053 | 10/1992 | WIPO . |

OTHER PUBLICATIONS

John G. Proakis, *Digital Communications* (McGraw–Hill, Inc., 1995), pp. 167–168.

Digital Communications, Third Edition, McGraw–Hill, Inc. John G. Proakis, Ph,D., P.E., Department of Electrical and Computer Engineering Northeastern Univ. (textbook reference).

Numerical Recipes by Press et al., Cambridge Univ. Press., pp. 52–64 and 192–199 (1987).

*Primary Examiner*—Thanh Cong Le
*Attorney, Agent, or Firm*—Townsend and Townsend and Crew LLP; Kenneth R. Allen

[57] ABSTRACT

Apparatus and method for transmitting a digitized wideband signal robust to multipath degradation and intersymbol interference within a predetermined broadcast band. A basis set of wideband mutually orthogonal pseudorandom basis signal waveforms of substantially equal length and having predetermined autocorrelation values and a predetermined spectral shape are generated. The length of the waveforms in the set represents a baud. The wideband waveforms of the basis set are data modulated so as to define digital data. The basis set substantially maintains the predetermined spectral shape during the modulation.

19 Claims, 21 Drawing Sheets

U.S. PATENT DOCUMENTS

| | | | |
|---|---|---|---|
| 5,239,560 | 8/1993 | Daniel . | |
| 5,241,562 | 8/1993 | Partyka et al. | 375/205 |
| 5,249,200 | 9/1993 | Chen et al. | 375/296 |
| 5,278,826 | 1/1994 | Murphy et al. | 375/205 |
| 5,278,844 | 1/1994 | Murphy et al. . | |
| 5,280,537 | 1/1994 | Sugiyama et al. | 375/205 |
| 5,282,222 | 1/1994 | Fattouche et al. | 375/205 |
| 5,285,472 | 2/1994 | Leonard et al. | 375/215 |
| 5,287,388 | 2/1994 | Ogura et al. | 455/192.2 |
| 5,291,289 | 3/1994 | Hulyalkar et al. | 348/723 |
| 5,291,520 | 3/1994 | Cole | 375/285 |
| 5,297,033 | 3/1994 | Bito et al. | 364/413.2 |
| 5,307,378 | 4/1994 | Norimatsu | 455/86 |
| 5,309,474 | 5/1994 | Gilhousen et al. | 375/205 |
| 5,442,661 | 8/1995 | Falconer | 375/205 |
| 5,488,629 | 1/1996 | Takahashi et al. | 375/206 |
| 5,533,013 | 7/1996 | Leppanen | 370/342 |

METHOD AND SYSTEM FOR SIMULTANEOUSLY BROADCASTING AND RECEIVING DIGITAL AND ANALOG SIGNALS

RELATED APPLICATIONS

This application is related to commonly-owned U.S. Pat. No. 5,465,396 issued on Nov. 7, 1995, the contents of which are herein incorporated by reference.

This invention relates to a system and method for transmitting digital signals from one location to another. More particularly, this invention relates to a method and system for simultaneously broadcasting and receiving digital and analog (e.g. FM) signals in a multipath environment.

BACKGROUND OF THE INVENTION

In recent years, the quality of commercial audio broadcast signals as delivered by radio transmitters through atmospheric free-space has been eclipsed by the quality of stored program material, such as digital compact disk and audio tape technology. The quality differential of such stored digital program material over conventional analog frequency modulated (FM) broadcasting is so significant that there has been a market shift in listener preference to the stored digital program material. Further adding to this market shift is the increased degradation of FM signal quality, particularly in highly urban areas, due to multipath and noise.

Multipath degradation and the quality of FM signals are inherent problems with the line of site propagation of radio signals, such signals being subject to interference and fading from reflected copies of the signal, both narrowband and broadband. Such interference resulting from the simultaneous reception of multiple propagation paths between the transmitter and receiver is commonly referred to as multipath (MP), the different propagation paths having varying times-of-arrival, amplitude, and phase.

Digital communication systems involve the transmission and reception of binary information at a prescribed rate of transmission (bits/sec) over communication links which typically suffer various impairments due to environmental factors. One of the most difficult environments in which to achieve high quality digital radio communication is the mobile reception of atmospheric free space propagation in urban areas. The principal impairment in such environments arises from multipath, which causes the receiver to simultaneously receive signals via multiple propagation paths disposed between the transmitter and receiver. Receivers under such circumstances detect the summation of all paths, thus leading to significant signal disturbance In urban settings, tall buildings and the like act as strong MP reflectors, particularly in the very high frequency (VHF) region of from about 30–300 MHz, thereby causing the aforesaid multipath problems.

Generally speaking, digital communication systems involve the encoding, transmission, reception, and decoding of symbols. Symbols (or bauds) are analog waveforms, whose shapes represent patterns of one or more bits of digital information (e.g. binary 0s and 1s). The "baud rate" is the reciprocal of the "baud interval", the baud interval being the interval of time that corresponds to the duration of the symbol waveform, i.e. the baud rate equals 1 over the baud interval.

Typically, in digital systems the symbol waveforms are themselves generated by the additive combination of other analog waveforms (multichannel), which are altered or modulated in a manner which distinguishes between the presence of at least a binary zero and binary one (e.g. BPSK, M-ary, QPSK, etc.). The effect of multipath is to change the received waveform shapes so that, when detected, the correct bit pattern can no longer be satisfactorily decoded or demodulated. Thus, the characteristics of the symbol shapes or waveforms and the encoding/decoding processes are major factors in the achievement of a satisfactory Bit-Error-Ratio (BER) in a digital communication system of the multicarrier or multichannel type.

A simple approach to eliminate the problem of multipath (MP) in digital communication systems is to use a highly directional receiving antenna that rejects all propagation paths save one, the received path depending on the directional orientation of the antenna. However, this approach is impractical in mobile and highly diverse applications for, as will be recognized of one of skill in the art, it would be highly inconvenient and difficult to place directional antennas in automobile radios and the like. Thus, omni-directional antennas are preferable, especially in mobile transmission and reception environments.

The adverse effects of multipath (MP) on an isolated signal waveform may be grouped at least into the following three categories fading, dispersion, and intersymbol interference. Fading involves rapid amplitude variation as propagation paths constructively and destructively interfere, but may be controlled under certain circumstances with automatic gain control (AGC) circuits.

Dispersion is caused by time-varying phase disruption within and between bauds, and may be controlled under certain circumstances with an automatic equalizer. For example, a conventional tapped delay line equalizer is useful where it is necessary to select among or to adjust several attenuation (amplitude) and phase characteristics, the output being taken from a summing network which adds or sums the outputs of the taps. Such an equalizer is adjusted to the desired response (equalization of both phase and amplitude) by adjusting the tap contributions Intersymbol interference (ISI) is caused by the interaction of one symbol (or waveform) with other symbols in time. The automatic equalizer, which may be used to correct phase dispersion, may compensate for adverse effects of intersymbol interference when the symbol shape of the interfering waveform is approximately identical to that of the desired channel. However, it is difficult and expensive to correct intersymbol interference from undesired propagation paths which represent different symbols of bit patterns that substantially precede or succeed the desired symbol in time.

Therefore, a conventional technique often utilized to combat the adverse effects of multipath-induced intersymbol interference is to increase the time duration of the symbol interval (or baud interval) to be much longer than the expected multipath delay. Typical expected multipath delays generally range from a maximum of about 5 to about 30 microseconds (is) for a VHF channel. When this technique is properly utilized, the only substantial intersymbol interference remaining is caused by the symbol interfering with itself, this remaining interference being correctable under certain circumstances with an automatic equalizer.

However, the increase in time of the baud or symbol interval leads to a decreased data rate. Therefore, in order to maintain a specified data rate, it is necessary to increase the number of data channels (or the number of carriers or waveforms) in order to make up for the loss in throughput caused by the reduced baud rate (or increased baud interval).

Thus, a conventional approach utilized in balancing the problems of reduced data rate and multipath (MP) is the use of increased symbol or baud intervals in combination with multiple data channels or multicarriers, each channel having a particular and unique symbol waveform. Unfortunately, the presence of multiple data channels and therefore multiple waveforms becomes a further source of interference, particularly in the presence of multipath. This additional interference due to the multiple channels or carriers eliminates under certain circumstances some of the performance gains achieved via the use of increased baud or symbol durations.

In such multichannel systems with increased baud intervals, the shapes and characteristics of the basis waveforms have significant influences on the BER, the basis waveforms being the unmodulated sequences representing the data carrier of each channel. Accordingly, there has been research into defining desirable characteristics of signal waveforms usable in such multichannel environments for producing superior performance. This research has often been conducted in combination with the use of conventional correlation receivers. In a conventional correlation receiver, a satisfactory received signal is one which satisfies the spectral confinement requirements of the particular application, and is characterized by predetermined crosscorrelation and autocorrelation properties.

The crosscorrelation property (or orthogonality) is measured between a single signal waveform in a set and all other members of the waveform set. Low crosscorrelation is important in multichannel carrier systems in order to ensure that the individual carriers may be recovered and recognized independent of one another. The crosscorrelation represents the degree to which a particular waveform is mathematically correlated with another waveform(s) in the set. The smaller the absolute value of the crosscorrelation between any two waveforms, the more unique the waveforms in the correlation sense. Therefore, an ideal signal set for a correlation receiver has a crosscorrelation of close to about zero at the sampling point among all pairs of the set or, in other words, is a set where the waveforms are mutually orthogonal. Good crosscorrelation properties are also required for satisfactory channel performance absent multipath because channels act as sources of interference to each other.

Good autocorrelation is of primary importance in multipath environments. The autocorrelation property of a particular symbol or waveform is measured only with respect to that particular waveform. In other words, the autocorrelation property of a particular waveform is unaffected by properties of other sequences or waveforms throughout the set. The autocorrelation is a measure of how unique a signal is when compared to itself in a correlation receiver when shifted in time by a positive or negative amount or time shift. Good autocorrelation characteristics are critical for good performance in multipath environments because reception in such environments requires distinguishing among similar signals with varying times of arrival. An ideal signal set with respect to autocorrelation is one where the autocorrelation for each signal is at a minimum (or has a low value) for substantially all positive and negative time shifts and is at a maximum for about zero offset or, in other words, for relatively no time shift at all.

Signal waveforms constructed from amplitude samples of unconstrained (or unshaped) and non-orthogonal noise sequences have been proposed and utilized in prior art communication systems (e.g. spread spectrum applications) In a similar manner, prior art systems have utilized prime polynomials to generate pseudo-random binary sequences (also known as PN or direct sequence) which are limited to the values +1 and +1. Such bi-valued systems do, however, possess somewhat noise-like properties to a limited extent.

The prior art method of Code Division Multiple Access (CDMA) utilizes long baud intervals in a plurality of digital data channels, each carrier being a binary sequence obtained from, for example, Gold codes or Rademacher-Walsh codes. CDMA systems are spread spectrum systems that use multiple binary-valued codes to achieve a higher throughput or increased capacity than a single spread spectrum code. CDMA codes generally must make a tradeoff between crosscorrelation and autocorrelation, but typically cannot satisfy acceptable characteristics with respect to both.

A primary disadvantage of CDMA is that it does not permit spectral shaping of the carrier(s) without significant destruction of the sequence properties Additionally, the number of different acceptable signals which may be generated by CDMA codes is limited by the bi-valued nature of such signals.

The prior art method of Coded Orthogonal Frequency Division Multiplexing (COFDM) also utilizes long baud intervals or symbol intervals and numerous narrowband channels. However, each channel is often a sinusoid of prescribed frequency and phase Therefore, the waveforms representing the different channels of COFDM do not have noise-like properties, and are of the narrowband type thus leading to susceptibility to multipath and less than desireable autocorrelation values. While COFDM generally permits spectral shaping so as to allow individual carrier amplitudes to fit under predetermined spectral masks, a disadvantage of COFDM is that, because multipath is frequency selective, the COFDM narrowband channels with frequencies that correspond to multipath nulls will be significantly disrupted as discussed later herein.

An additional disadvantage of COFDM is that the presence of a narrowband interference within the COFDM spectrum will cause excessive bit errors because of the COFDM narrowband channels. While Forward Error Correction coding (FEC) may be used to improve the performance of COFDM, this improvement is at the expense of increased implementation complexity. Additionally, carrier recovery in OFDM systems is difficult because of different frequencies undergoing different phase shifts.

Additionally, the use of filtered Trellis-Coded Modulation (TCM) to shape signal spectra for use in digital data communication systems with sinusoidal signal waveforms is conventional in the art. However, Trellis codes alter the nature of the waveform properties so that, after interacting with the filter, only those patterns which produce waveforms with the desired properties are allowed to be used. Unfortunately, this requires a significant reduction in user data rate which is, of course, undesirable because, among other reasons, additional bits must be used purely for code shaping. Furthermore, Trellis codes require highly complicated and expensive receivers, which have much higher complexities than do simple correlation receivers.

The use of broadband or wideband signal sets is known as a method of combating the adverse effects of multipath. Wideband waveforms have diffused frequency content. Thus, because multipath is a frequency selective phenomenon, disturbing some frequencies more than others, it has an extremely adverse effect on narrowband waveforms such as sinusoids. In fact, in certain types of multipath known as specular, certain frequencies are allowed no transmission whatsoever of information. In multipath (MP) environments, although each of the wideband waveforms in a set suffers some interference or loss of signal due to certain frequency content disturbances (in contrast to the sinusoid example where some frequencies may be unaffected), as a whole, the wideband waveforms are all still sufficiently recognizable so as to permit accurate symbol recovery and thus allow for significant advantages in the presence of narrowband interference.

In applications where spectrum compliance is not an issue, direct-sequence spread spectrum techniques which utilize noise-like waveforms are effective in combating multipath. However, existing techniques for constructing noise (or the more restrictive example of pseudo-noise) waveforms do not permit arbitrary constraints in the shape of their spectral response without significantly disrupting the resulting waveform properties. This is important because practical systems require band limiting filters or similar processing in order to stay within a fixed frequency allocation and/or reject particular narrowband interference. Furthermore, although the crosscorrelation is small in spread spectrum systems, it is generally non-zero and hence the signal waveforms act as interferers to one another even in the absence of multipath.

U.S. Pat. No. 5,278,826 discloses a method and apparatus for digital audio broadcasting and reception wherein a system is provided for transmitting and receiving through free space a composite signal consisting of a frequency modulated (FM) analog signal and a multicarrier modulated digital signal which is especially adapted to be resistant to multipath degradation. The FM signal and digital multicarrier modulated signal are fully coherent. The digital signal comprises a plurality of carriers having a maximum amplitude at least 20 dB below the unmodulated FM signal, preferably 30 dB below the FM signal. Unfortunately, the multicarriers making up the digital signal in this patent are narrowband in nature, each carrier or channel being a single tone which is phase modulated. A problem with such carriers is that multipath (MP) is a frequency selective phenomenon which alters or destroys some frequencies while letting others alone. Thus, narrowband carriers are extremely vulnerable to the adverse effects of multipath. Furthermore, the digital frequency spectrum in this patent is extremely close to the FM center frequency, thus resulting in interference between the FM and digital signals.

U.S. Pat. No. 4,403,331 discloses a method and apparatus for transmitting digital data over limited bandwidth channels, with a set of waveforms being mutually orthogonal to one another. The use of orthogonal channel waveforms (known as basis functions) and bi-phase data modulation in order to use a correlation-type multiple channel or multicarrier receiver is known in the art, as illustrated by this patent. This patent discloses a technique for determining eigenvectors for the basis functions which maximize the spectral occupancy of the carrier waveforms primarily by utilizing a longer baud interval. The basis functions of this patent in certain embodiments are based on a fixed number of sinusoids (which are not noise-like), and the system utilizes an optimization in the frequency domain. Unfortunately, this does not translate into good autocorrelation properties or resulting waveforms which may be made phase-continuous at the baud boundaries. The lack of phase continuity at baud boundaries increases intersymbol interference, thereby limiting the ability to properly receive signals with good BER. Additionally, it is noted that optimization in the frequency domain does not translate necessarily into optimization in the time domain.

It is apparent from the above that there exists a long felt need in the art for a digital data transmission system and method including the production of a set of wideband spectrally shaped noise-like waveforms which are mutually orthogonal to one another and have good autocorrelation values so as to enable an inexpensive and relatively simple correlation receiver to decode the digital data transmitted via the waveforms in the face of high multipath and intersymbol interference environments, the use of wideband noise-like orthogonal signals allowing the system to be robust (or strongly resistant) to multipath problems. Additionally, there exists a need for such a signal set which may be spectrally shaped so as to allow an analog signal (e.g. analog FM) to be disposed between two separate and spaced apart portions of the spectrally shaped orthogonal set of waveforms or sequences wherein each of the analog FM signals and the two surrounding digital waveform portions are disposed within a predetermined broadcast band or spectral mask.

There also exists a long felt need in the art for a system which allows a radio broadcasting station to simultaneously transmit the same program material via both analog FM and digital signals via a combined FM/digital signal to a plurality of radio receivers, any of which may receive and demodulate one of the FM and digital signals so that existing receivers will remain useful and receivers produced pursuant to the disclosed invention will be able to demodulate the digital signal.

SUMMARY OF THE INVENTION

Generally speaking, this invention fulfills the above-described needs in the art by providing a basis signal set for use in transmitting digital data from a first location to a second location through atomspheric free space, the signal set comprising a plurality of different noise-like wideband waveforms or sequences of a predetermined length making up the signal set, each of the waveforms representing a digital data carrier or channel, wherein each of the plurality of waveforms has predetermined autocorrelation characteristics and the plurality of noise-like wideband sequences making up the signal set are substantially orthogonal in pairs at the sampling point In certain preferred embodiments of this invention, the set has a crosscorrelation/autocorrelation ratio of less than about 0.001.

This invention further fulfills the above-described needs in the art by providing a method of simultaneously transmitting an analog FM signal and a digitized wideband signal robust to multipath degradation and intersymbol interference within a predetermined broadcast band, the method comprising the steps of:

a) producing an analog FM signal substantially centered about a center frequency of a predetermined broadcast band;

b) generating a basis set of wideband mutually orthogonal spectrally shaped noise-like basis signal waveforms of substantially equal length and having predetermined autocorrelation values, the length of the waveforms in the set representing a baud, the spectral shape of the basis waveforms in the basis set including two spaced apart sections, one on each side of the center frequencies, c) data modulating the wideband waveforms of the basis set so as to define digital data, the basis set substantially maintaining its spectral shape during the modulation;

d) linearly combining the analog FM signal and the modulated waveforms to produce a composite analog FM/digital signal; and e) transmitting the composite FM/digital signal through atmospheric free space to at least one receiver.

This invention further fulfills the above-described needs in the art by providing a wireless modem for transmitting a multicarrier wideband digital signal robust to multipath degradation and intersymbol interference, the modem comprising:

means for generating a basis set of wideband spectrally shaped noise-like waveforms having predetermined autocorrelation values and being substantially orthogonal to one another, each of the waveforms in the set representing a signal carrier and the length of the waveforms representing a baud;

means for data modulating and summing together the basis set of waveforms so as to define a digital signal, the set maintaining its spectral shape through the modulating; and means for transmitting through free space the digital signal to a receiver.

In certain preferred embodiments of this invention, the modem further comprises means for generating and transmitting to the receiver a wideband reference signal summed together with the modulated set of waveforms, the wideband reference signal having a spectral shape substantially equal to the spectral shape of the waveforms.

This invention further fulfills the above-described needs in the art by providing a method for implementing a high spectral efficiency digital communication link in channels with known colored interference and multipath, the method comprising the steps of:

a) determining the spectral content of the known colored interference;

b) generating a basis set of wideband mutually orthogonal waveforms, the waveforms having predetermined autocorrelation characteristics;

c) spectrally shaping the basis set to complement the colored interference;

d) setting the baud interval, or length of the waveforms, to a value greater than a determined longest expected multipath delay;

e) data modulating the waveforms; and f) transmitting the modulated waveforms over the digital communication link from a transmitter to a receiver.

In certain preferred embodiments, the method further includes the step of:

g) summing together a wideband reference signal with the modulated waveforms of the set so that the reference signal is spectrally confined substantially to the extent of the noise-like modulated waveforms of the set.

In further preferred embodiments, the method includes the step of:

h) measuring the frequency of the reference signal in the receiver and accordingly adjusting a baud clock in the receiver so as to ensure data synchronization in the receiver and transmitter.

This invention will now be described with respect to certain embodiments thereof, accompanied by certain illustrations, wherein:

BRIEF DESCRIPTION OF THE DRAWINGS

The above and other objects and advantages and novel features of the present invention will become apparent from the following detailed description of the preferred embodiment of the invention illustrated in the accompanying drawings wherein.

DETAILED DESCRIPTION OF PREFERRED EMBODIMENTS OF THIS INVENTION

Figure 1:
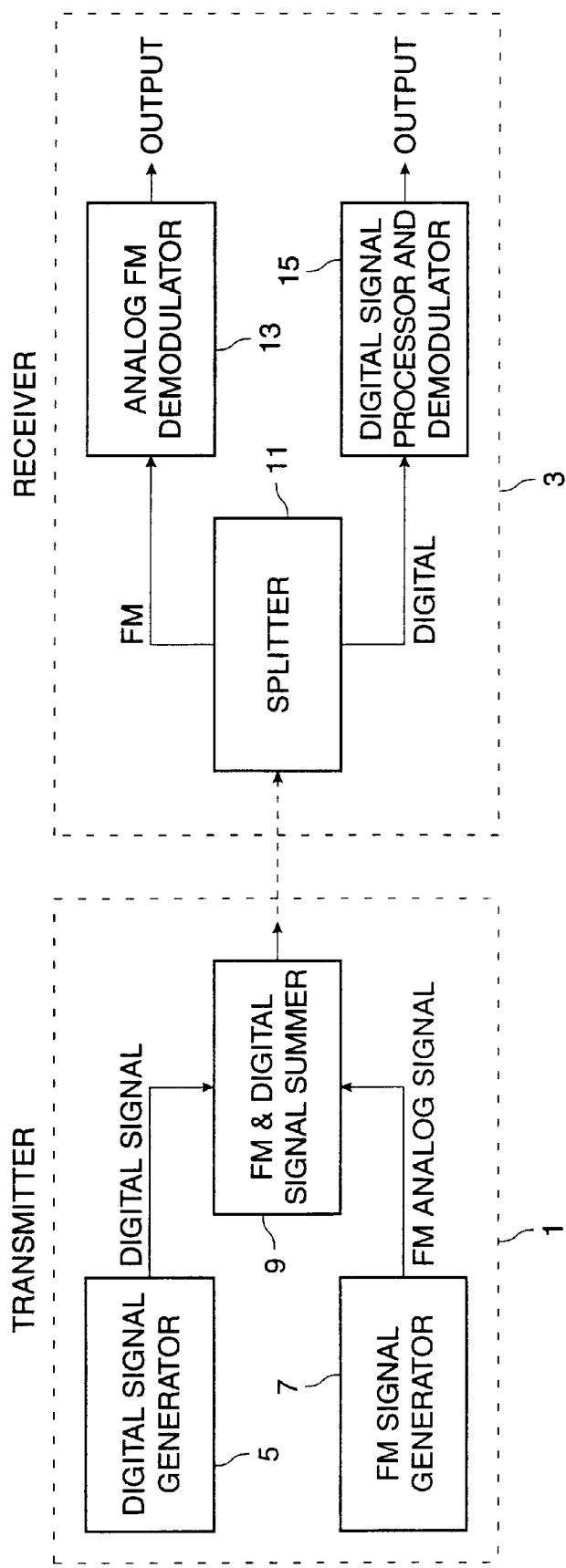
FIG. 1 is a block diagram of a broadcast system including a transmitter and receiver according to a first embodiment of this invention.

Referring now more particularly to the accompanying drawings in which like reference numerals indicate like parts.

As best shown in FIG. 1, a system for simultaneously broadcasting and receiving digital and analog signals according to a first embodiment of this invention includes transmitter 1 and receiver 3. As shown, transmitter 1 simultaneously transmits or broadcasts both an analog frequency modulated (FM) signal and a digital signal in this first embodiment, the two signals being summed together to form a composite FM/digital signal to be broadcast to receiver(s) 3. Preferably, when used for broadcast to automobiles and the like, the digital signal and the analog FM signal correspond in their content when demodulated by receiver 3 for listening by a user, although this need not be the case.

Transmitter 1 includes digital FM signal generator 5 and analog FM signal generator 7. The analog FM and digital signals may or may not contain the same audio program material, depending upon the intended use of the system. Thus, according to this embodiment, a radio station is able to simultaneously transmit a particular audio program via both digital and analog FM signals utilizing a single composite analog FM/digital signal and one transmitting antenna, the composite signal being transmitted to a plurality of receivers 3.

The composite FM/digital signal broadcast by transmitter 1 may be received by either a conventional analog FM receiver, a digital receiver, or a combination FM/digital receiver 3 as illustrated in FIG. 1.

Following generation of both the digital signal and the analog FM signal in transmitter 1, the two signals are linearly combined at summer 9. Thereafter, the composite FM/digital signal is broadcast over atmospheric free space (i.e. through the air) to at least one and preferably a plurality of receivers 3. Upon receiving the composite FM/digital signal at the radio frequency (RF) carrier frequency via an omni-directional antenna, the composite FM/digital signal is divided into two paths by way of splitter 11 disposed in FM/digital receiver 3.

One path exiting splitter 11 proceeds toward conventional analog FM demodulator 13 where the analog FM signal is interpreted and output in a conventional manner. The other portion of the FM/digital signal from splitter 11 is directed toward digital signal processor and demodulator 15. Digital processor and demodulator 15 filters out the analog FM portion of the composite signal and thereafter processes the digital portion so as to output a digital audio data stream for reproduction in a conventional manner.

Receiver 3 is a combination FM/digital receiver which may output both the analog FM and digital portions of the received composite signal. The composite signal may also be received by a conventional FM receiver having a conventional FM demodulator 13 (but not splitter 11 and demodulator 15). Alternatively, the composite signal may be received by a purely digital receiver according to another embodiment of this invention including digital signal processor and demodulator 15 (but not splitter 11 and FM demodulator 13). Thus, the composite signal may be received by a variety of receivers, the result being that existing analog FM receivers will continue to be usable even while the transmitter 1 broadcasts the composite signal much like black and white televisions were still usable after the development of color television. Thus, when such a composite analog/digital signal is transmitted, the quality (analog versus digital) of reception and reproduction depends upon the type of receiver being utilized.

Figure 2:
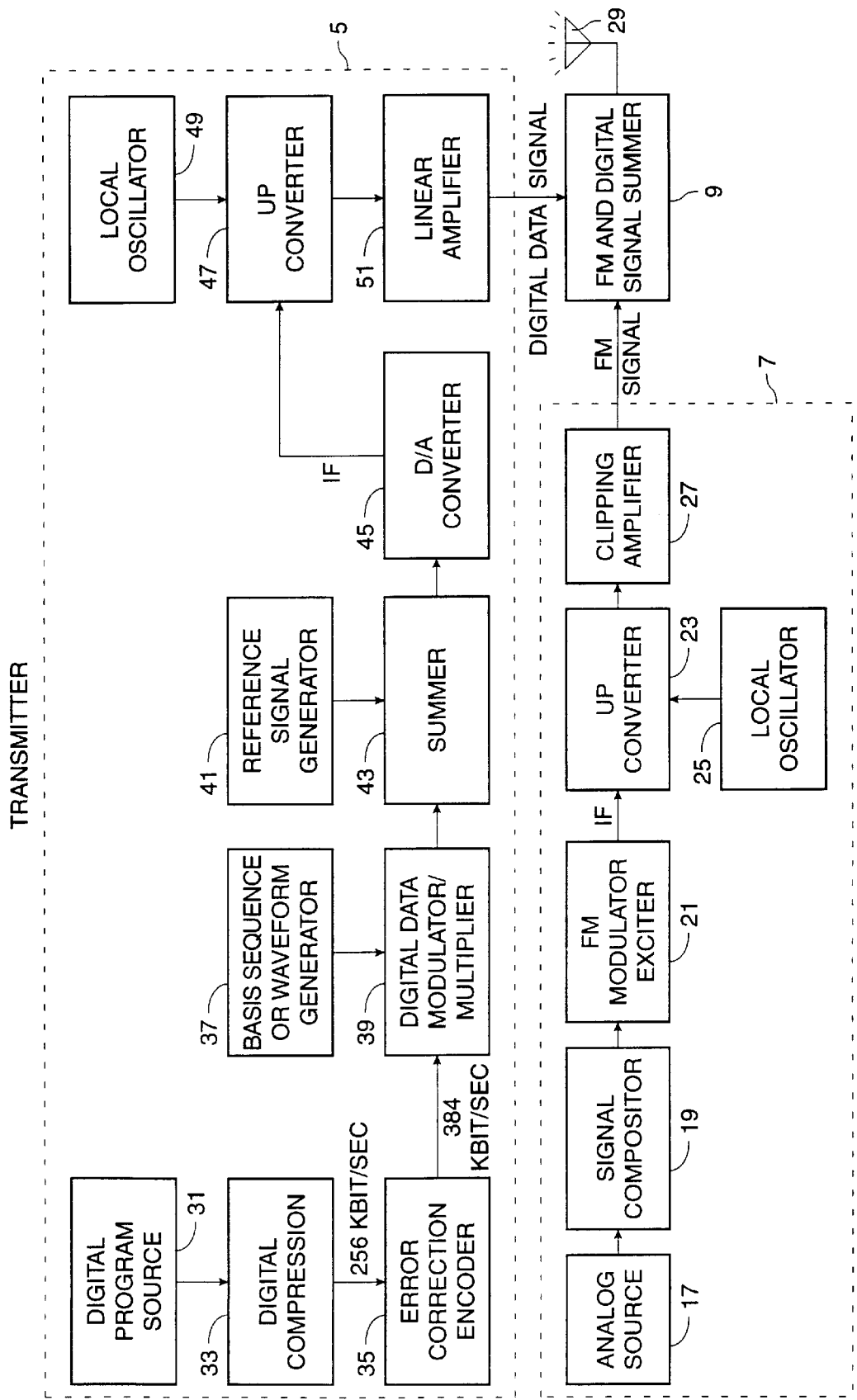
FIG. 2 is a block diagram of the transmitter portion of the first embodiment of this invention depicted in FIG. 1.

FIG. 2 is a more detailed block diagram of 22 transmitter 1 shown in FIG. 1. Analog FM signal generator 7 generates an analog frequency modulated signal in a conventional manner utilizing analog source 17, signal compositor (or audio stereo generator) 19, FM modulator (or exciter) 21, upconverter 23, local oscillator (LO) 25, and clipping amplifier 27.

Analog source 17 may be any conventional program source, but is typically an audio program source with the possible addition of a data program source on a side carrier (SCA). An SCA may be a further audio source or a data source. Signal compositor 19 is representative of the stage of analog FM signal generation which produces the composite baseband signal, sometimes including a pilot tone. From source 17 and compositor 19, the signal is directed to frequency modulator or exciter 21 which is a subsystem for modulating the composite baseband signal of compositor 19 in a frequency typically across about a 200 kHz bandwidth or less in proportion to instantaneous amplitude of the composite signal to produce an output signal centered about a center frequency.

After signal processing via frequency modulator 21, the modulated wave is at an intermediate frequency (IF) and is then upconverted to the desired output frequency by upconverter 23 and local oscillator (LO) 25. The FM signal is thus centered about the center frequency of a particular broadcast band. The upconverted signal may then be applied directly to summer 9 and transmitting antenna 29 for radiation, or alternatively may be processed through clipping amplifier 27.

Alternatively, upconverter 23 and LO 25 may be eliminated and in such a case exciter 21 would directly generate the final FM signal at the destination RF frequency, thereby skipping the IF step.

Conventional FM modulator or exciter 21 is basically a voltage-controlled oscillator (VCO) whose modulation is controlled by compositor 19. Furthermore, an SCA generator box may also feed exciter 21 in certain embodiments.

Digital signal generator 5 of transmitter 1 outputs a multicarrier or multichannel digital data signal to signal summer 9 by way of utilizing the following components or steps: digital program source 31, digital compression station 33, error correction encoder 35, basis sequence or waveform generator 37, digital data modulator/multiplier 39, reference signal generator 41, modulated set and reference signal summer 43, digital-to-analog (D/A) converter 45, upconverter 47, local oscillator 49, and linear amplifier 51. Separate amplifiers are utilized for the digital and FM signals because the digital signal power level is smaller than the FM power level in certain embodiments, thus a clipping amplifier is used for the FM signal.

Alternatively, use of an IF may be avoided in the transmitter as shown in the FIGS. 19(b)–19(c) transmitter embodiment to be described later herein. In this embodiment, the signal is directly modulated at the final RF carrier frequency by sending the samples from the MAC to an I D/A converter and a Q D/A converter in alternating fashion and using a hybrid I/Q modulator.

With reference again to FIG. 2, digital program source 31 may produce any conventional digitized program material, but is illustrated in this first embodiment as being a source of digitized audio data. Coupled to digital source 31 is digital compression station 33 which reduces the bandwidth requirements of the audio signal, so as to allow more cost effective and economic signal transmission and processing. A suitable compression station may, for example, operate in accordance with the MUSICAM standard described in U.S. Pat. No. 4,972,484. However, any conventional compressor will suffice.

The compressed digital audio data making up a digital data stream of about 256 kbit/sec in the first embodiment, is then sent to error correction encoder 35 which adds redundancy of, for example, 128 kbit of error correction code in order to assist in signal recovery. Thus, in the first embodiment, the digital data stream emitted from error correction encoder 35 is the combination of the 256 kbit/sec data stream input into encoder 35 and the 128 kbit of error correction code, so as to in combination make up about a 384 kbit/sec data stream which is forwarded to modulator/multiplier 39. Encoder 35 includes a data scrambler which ensures that the resulting binary sequence is substantially random in pattern.

In certain embodiments of this invention, the audio signal is protected at error correction encoder 35 by a combination of different error correction codes. For example, the central audio portion or main portion (or other critical synchronization data) of the signal may be protected by way of Viterbi code which works at high levels of interference and is fairly aggressive in nature, while the higher and lower portions of the signal are encoded with Reed-Solomon block coding. Thus, a combination of Viterbi and Reed-Solomon error correction codes may be used to protect the audio signal, with each code protecting a different portion of the signal so as to protect music fidelity. Such a combination of Viterbi and Reed/Solomon encoding may be obtained from Corporate Computer Systems (CCS) based in Holmdel, N.J. Alternatively, conventional Reed-Solomon error correction code may be utilized to protect the entire audio signal.

When the combined audio and error correction code (ECC) data proceeding at a rate of 384 kbit/sec reaches modulator/multiplier 39, it is applied to a wideband or broadband set of noise-like orthogonal basis sequences or waveforms output from generator 37.

Reference is now made to FIGS. 3–18 which are utilized herein to describe the functionality and output of basis sequence generator 37, FIGS. 3–6 illustrating certain advantages of broadband or wideband signals, and FIGS. 7–18 illustrating the characteristics and processes utilized for generation of the set of basis sequences or waveforms. It is noted at this time that in the first embodiment of this invention, generator 37 produces a set of 48 unique sequences or waveforms for each baud, each waveform corresponding to a different digital carrier or channel. The same 48 basis waveforms are output for each baud.

As discussed above, multipath (and intersymbol interference) are principal obstacles which stand in the way of satisfactory signal transmission in many environments. Low baud rates are more robust in multipath environments because the baud period or interval is much longer than the longest expected multipath delay. When baud intervals or periods are shorter than the experienced multipath delay, then the direct and multipath signals are out of baud synchronization and strong intersymbol interference results.

Figure 3A:
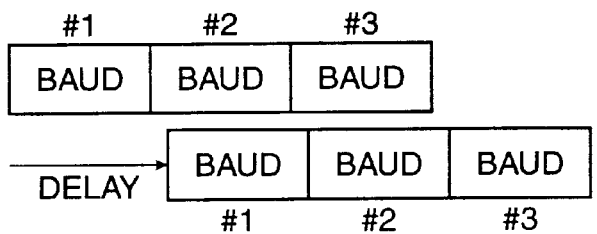
FIGS. 3(a) and 3(b) are a schematic illustration of certain advantages associated with long baud intervals in multipath environments.
Figure 3B:
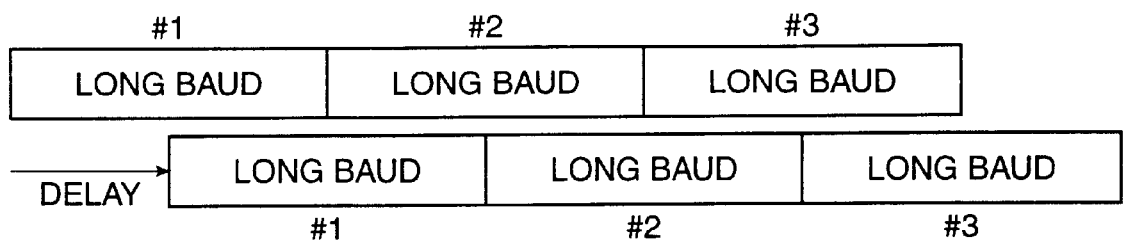

FIGS. 3(a) and 3(b) illustrate a pair of approaches for digital data transmission, FIG. 3(a) illustrating a multipath delay greater than the baud interval or length being utilized and FIG. 3(b) illustrating a lengthened baud interval resulting in the multipath delay being shorter than the baud interval.

In FIG. 3(a), the relatively short baud interval causes baud #1 as delayed to overlap baud #2 as directly transmitted, the delayed baud pattern being illustrated below the directly transmitted baud patter unaffected by multipath. Because the baud interval in FIG. 3(a) is shorter than the multipath delay, substantial intersymbol interference results.

However, as illustrated in FIG. 3(b), because the baud interval is longer than experienced multipath delay, intersymbol interference is reduced because delayed baud #1 only overlaps directly transmitted baud #1 (not baud #2). Thus, low baud rates (equivalent to longer baud intervals) are more robust or resistant to multipath problems, the baud rate being defined as the reciprocal of the baud period or interval. It is noted that there is a limit to the length of a baud—if the baud is too long, then the carrier frequency may not be sufficiently stable during the entire baud interval, particularly in mobile situations where the Doppler frequency varies as the automobile changes velocity. The practical limit in certain embodiments is less than about a millisecond.

Figure 4A:
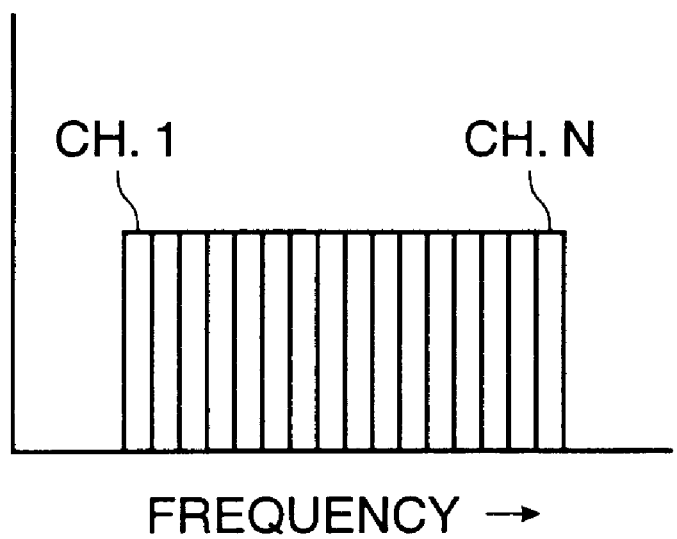
FIGS. 4(a) and 4(b) are graphs illustrating narrowband and wideband (broadband) signal sets, respectively, with respect to frequency allocation.
Figure 4B:
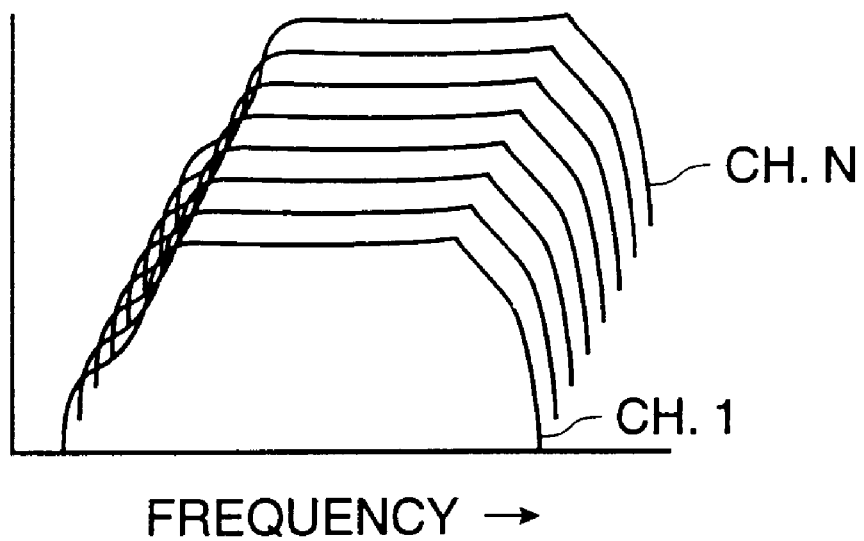

Unfortunately, long baud intervals reduce intersymbol interference at the expense of data rate. The use of baud intervals longer than the expected multipath delay keeps the transmitted bauds synchronized and reduces error due to intersymbol interference, but on the other hand results in lower data rates than do the shorter baud times shown in FIG. 3(a). Therefore, to achieve the same data rates in the systems of FIGS. 3(a) and 3(b), the system utilizing longer baud times (e.g. FIG. 3(b)) must increase the number of transmission channels or carriers within a particular bandwidth (i.e. more channels or carrier per baud are required). The more channels or carriers, the longer the baud interval may be and thus the better the MP performance. However, the drawback to more carriers is that a greater number of channels necessitates more hardware which increases the cost of the system Broadband or wideband signals reduce the impact of multipath (MP) induced fading. FIGS. 4(a) and 4(b) illustrate and compare a narrowband (e.g. COFDM) set of N channels and a broadband set of N channels respectively In the narrowband case of FIG. 4(a), each channel or carrier is assigned a particular and substantially different frequency, and each channel or carrier is separated from the other channels at the receiver by a frequency filter. Thus, in the narrowband case illustrated in FIG. 4(a), channel 1 has the lowest frequency while channel N has the highest frequency.

In contrast to the narrowband approach, signals within a broadband set all substantially have the same general frequency characteristics and cover substantially the entire available frequency band. Thus, in the wideband case shown in FIG. 4(b), channel 1 and channel N both cover substantially the entire band.

Wideband waveforms which define these signals have two significant requirements. The signals must be designed so that they are orthogonal in nature at the sample point thus being separable by a matched filter or MAC within the receiver, and the spectral shape of the transmitted signals must be such as to avoid conflict with colored interference.

Figure 5A:
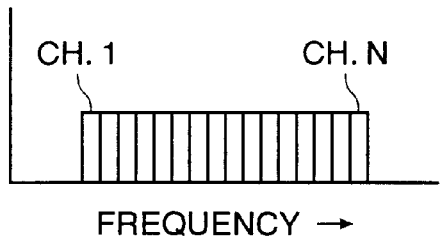
FIGS. 5(a), 5(b), 5(c), and 5(d) are a plurality of graphs illustrating the impact of multipath nulls or interference upon both narrowband and wideband signal sets.
Figure 5B:
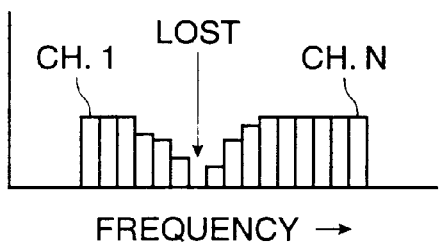

The advantage of wideband signals in combatting multipath nulls is illustrated in FIGS. 5(a) and 5(b). The graphs of FIGS. 5(a) and 5(b) illustrate the response of channels or carriers without multipath nulls while the graphs of FIGS. 5(c) and 5(d) illustrate channels experiencing multipath (MP) nulls.

The narrowband and broadband channels without multipath interference both have equal opportunity to support error free data communication. However, because multipath is a frequency specific interference, the multipath null shown in the graphs of FIGS. 5(c) and 5(d) completely destroys one or more narrowband carriers or channels, and severely attenuates several others (but does not completely destroy any wideband carriers). Thus, the narrowband carriers having assigned frequencies in the region of the multipath null lose substantially all power, and have relatively no chance to carry data without error. Therefore, in the face of a MP null, the error rate for a narrowband system cannot be better than 1/N, where N is the number of channels.

Figure 5C:
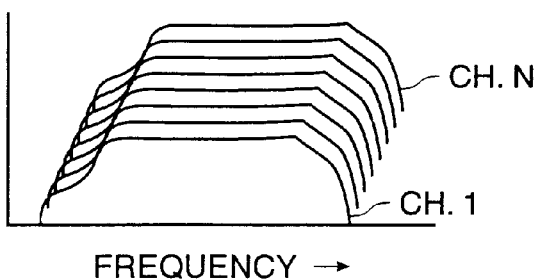
Figure 5D:
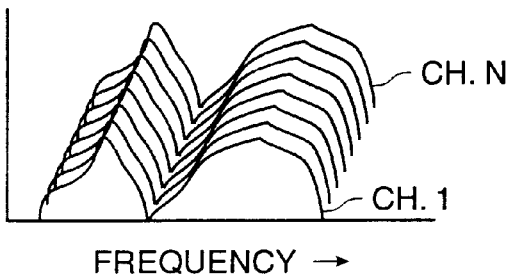

As shown in the graphs of FIGS. 5(c) and 5(d), the multipath null in the wideband channels of FIG. 5(d) impacts all channels to a certain extent, but leaves them all substantially intact. Each wideband channel thus has an opportunity to survive due to its remaining power. The error rate in wideband systems is generally determined by the quality of signal processing, and not by loss of signal power.

Figure 6A:
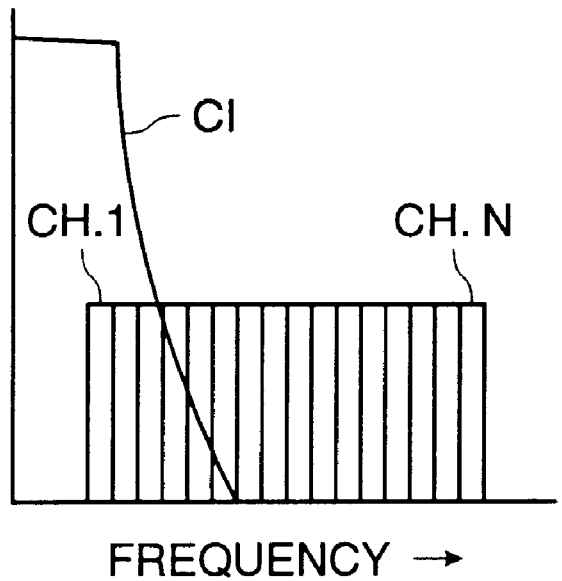
FIGS. 6(a) and 6(b) are graphs illustrating the adverse effects of colored interference upon narrowband and wideband carriers or signal sets, respectively.
Figure 6B:
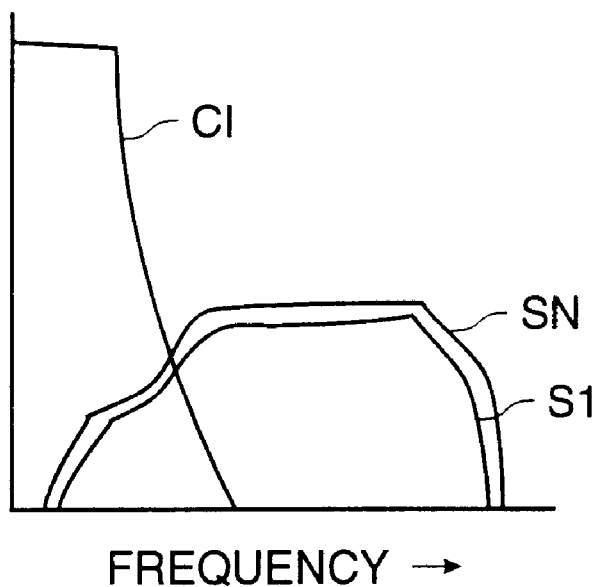

FIGS. 6(a) and 6(b) illustrate the impact of colored interference on multichannel or multicarrier receivers of both the narrowband and wideband type. The graph of FIG. 6(a) illustrates narrowband, and the graph of FIG. 6(b) depicts wideband. Colored interference is interference with a strong power at one frequency region (covering one or more frequencies), and weak power at other frequency regions. Thus, colored interference is defined as interference having an unequal distribution of interfering energy as a function of frequency.

Because the broadband channels as illustrated in FIG. 6(b) all have substantially the same spectral shape and cover the entire frequency bandwidth, the impact of colored interference is minimized because each channel or carrier is left with an ample amount of power, even though all wideband channels suffer at least some impact due to the colored interference. In other words, no wideband channels are totally overwhelmed, so the opportunity remains for data transmission without error in the wideband case.

However, in the case of the frequency specific narrowband channels, the colored interference illustrated in FIG. 6(a) completely overwhelms channels 1–3, but has no impact on channel N. Thus, the channels in the areas of colored interference have little chance for error-free transmission.

In view of the above, the advantages of a wideband signal set with a long baud length with respect to the BER in multipath and colored interference environments are clear when compared with the adverse effects experienced by narrowband signal sets. Baud lengths or intervals of about four times the longest expected multipath delay are used in certain embodiments of this invention.

Due to the numerous advantages discussed above with respect to wideband signal sets, basis sequence/waveform generator 37 of transmitter 5 in the first embodiment generates a basis signal set made up of a plurality of wideband carriers, each carrier or channel of the set having the same general frequency characteristics and covering substantially the entire available frequency band. Thus, the basis waveforms of channels 1–48 all cover substantially the same frequency band.

It is important that the sequences or waveforms of the basis signal set generated by generator 37 have good autocorrelation characteristics, good crosscorrelation characteristics at the sample point in time, and be spectrally shaped without substantially disturbing the autocorrelation and crosscorrelation characteristics. The basis broadband or wideband waveforms making up the different signals of the set output by generator 37 should be substantially orthogonal (or have a crosscorrelation of close to about zero at the sampling point of a waveform), so that each of the broadband waveforms can simultaneously co-exist without interfering with one another.

Additionally, the basis set of signals must have good autocorrelation properties for satisfactory performance in multipath environments, because reception in the face of multipath requires distinguishing among similar signals with varying times of arrival. An ideal signal set with respect to autocorrelation is one where each waveform or carrier within the set has an autocorrelation value of close to about zero for substantially all positive and negative time shifts, and an autocorrelation value which is at a maximum for no shift at all (or at zero time shift).

Such crosscorrelation (orthogonality) and autocorrelation characteristics must be maintained in situations where the waveforms or carriers making up the basis set are spectrally shaped with respect to frequency. Thus, the basis signal set output by generator 37 includes a plurality (e.g. 48 for each baud) of sequences or waveforms (each of which corresponds to a different channel) which are mutually orthogonal, have good autocorrelation values, and occupy a finite signal bandwidth (i.e. are spectrally shaped).

Figure 7:
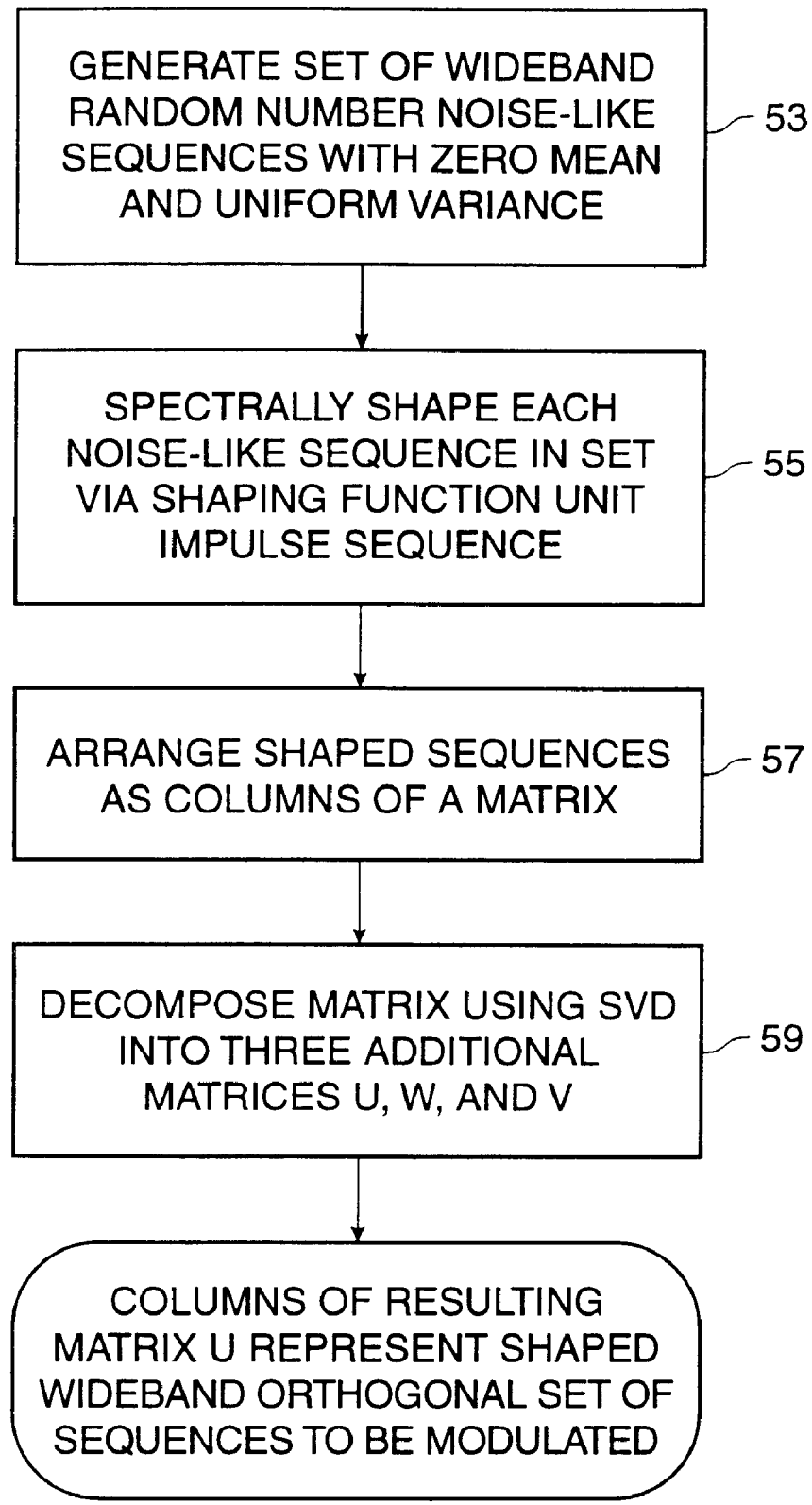
FIG. 7 is a flowchart illustrating steps utilized in generating a wideband orthogonal signal set having good autocorrelation characteristics according to the first embodiment of this invention.

FIG. 7 is a flowchart illustrating the steps taken by generator 37 in generating the basis sets having the above-described characteristics, the basis set for each baud being the same.

The generation of a set of such waveforms begins in step 53 with the numerical generation of a set of random number noise-like sequences with zero mean and uniform variance. The choice of probability density function (PDF) for the random numbers is not critical. Uniform and normal PDFs have been found to have satisfactory performance, at least in the first embodiment where composite analog FM and digital audio data are transmitted. The random numbers may be generated by a variety of conventional algorithms, e.g., shuffled linear congruential or subtractive algorithms set forth in *Numerical Recipes: The Art of Scientific Computing*, Pgs. 192–199 the disclosure of which is hereby incorporated herein by reference The random number generation algorithm utilized in step 53 produces uncorrelated numbers across the entire set of sequences or waveforms. In Appendix A at the end of the specification are two Fortran routines for generating satisfactory random numbers in this step.

Figure 8:
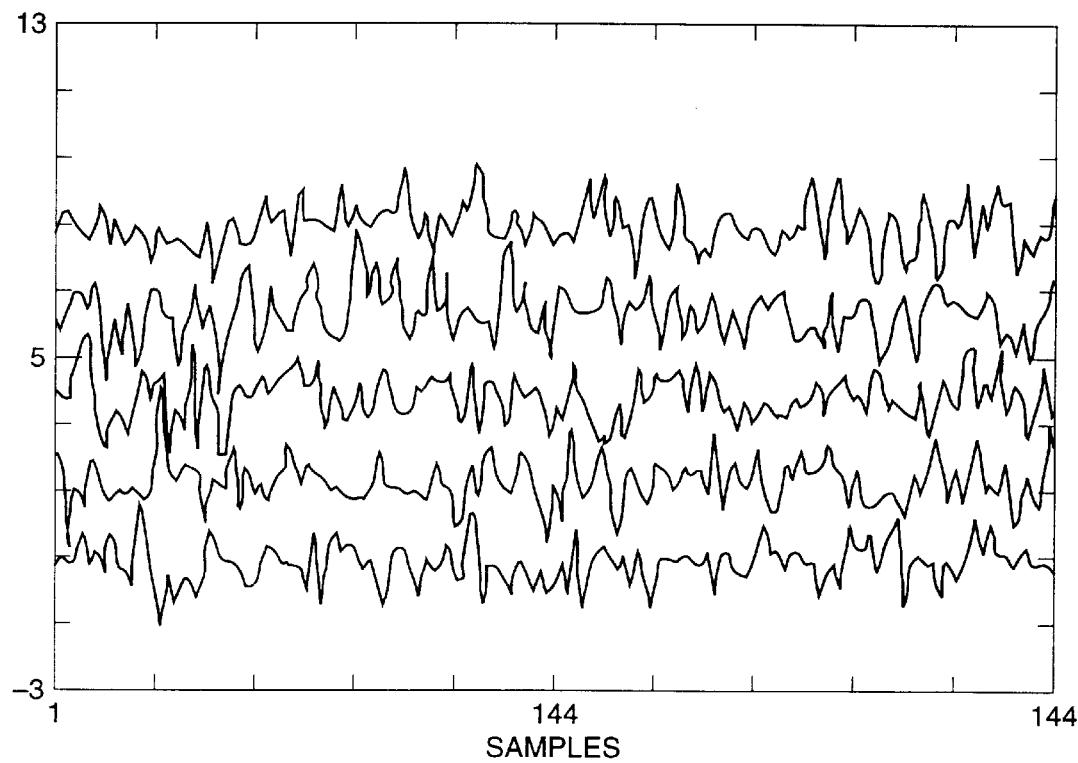
FIG. 8 is a graph illustrating five exemplary random number noise-like sequences as generated in the first embodiment of this invention.

Thus, in step 53 illustrated in FIG. 7, a plurality of random number sequences or waveforms which are noise-like in nature are generated, each sequence or waveform to correspond with a particular carrier or channel in a baud. Five exemplary such noise-like waveforms are shown in FIG. 8.

The maximum length of each sequence of random numbers is determined by the ratio of the baud interval to the sample interval. In the first embodiment of this invention, this maximum length may be equivalent to 192 samples. However, as a result of further processing, it is often desirable that the sequence length of each waveform be further reduced by approximately the length of the later to be discussed shaping functions. Hence, in the first embodiment of this invention, the random number sequences which are noise-like in nature may have about 144 samples each. The number of samples, however, and the baud length may vary according to the intended use of the system as will be appreciated by those of skill in the art.

The number of noise-like sequences or waveforms generated in step 53 must be at least as great as the number of data channels or carriers which are required per baud in the overall transmission/reception system. In certain embodiments, twice as many sequences as the desired number of data channels may be created.

For example, the first embodiment of this invention including FM/digital transmitter 1 and radio receiver 3 has a data rate requirement of about 384 kbit/sec. With a baud rate of about 8 kbit/sec, at least about 48 sequences or waveforms (i.e. channels) are required. Therefore, from about 48–100 random number sequences are generated in certain embodiments. However, these parameters may change as will be recognized by those of skill in the art.

The noise-like sequences are not two-valued as in CDMA. They each have significantly more such values because of the noise-like characteristics illustrated in FIG. 8 due to the aforediscussed random number generation, thus resulting in good autocorrelation characteristics. In other words, the use of multivalued random number generation with zero mean and uniform variance results in noise-like waveforms, and allows greater degrees of freedom than do two-valued codes, such as CDMA, and thus results in waveforms having good autocorrelation characteristics.

The parameters "baud interval" and "sample interval" are parameters which are taken into consideration in designing the system according to the first embodiment of this invention.

The sample interval (or equivalently the reciprocal of the sample rate) is the increment of the underlying grid of time intervals on which the digital amplitude samples are constructed and used in making up the basis waveforms. The maximum sample interval is set by the required Nyquist bandwidth of the shaping function. Thus, the maximum sample interval is about twice the shaping function bandwidth. While there is no minimum sample interval, it is advantageous in certain environments to use as large an interval as possible, due to computational complexity increases associated with smaller intervals In the first embodiment of this invention, the sample rate for generating the basis waveforms may be, for example, about 1.536 MHz and the sample interval the reciprocal of this.

The "baud interval" is the interval of time which corresponds to the duration of a waveform or a symbol. Basis generator 37 outputs the same set of 48 carriers every increment of time defined by the baud interval. The product of the reciprocal of the baud interval and the number of channels or carriers is the overall throughput (e.g. 384 kbit/sec) of the communication system. Increasing the baud interval, as described above, improves the performance of the system by reducing the effect of intersymbol interference. Furthermore, the longer the baud interval, the more effective the method in determining sets of waveforms with the desired autocorrelation and crosscorrelation properties. The maximum baud interval is limited only by the receiver complexity, and in certain embodiments of this invention the baud interval may be about 125 microseconds ($\mu s$). Thus, generator 37 in the first embodiment outputs the same basis set of 48 waveforms every 125 microseconds when such is the baud interval.

FIG. 8 illustrates five of the 48 random number noise-like sequences generated in step 53 with a normal density random number algorithm with a mean of zero and a variance of one. These noise-like sequences of FIG. 8 are generally unsuitable for direct use, because they have poor crosscorrelation properties and are not subject to any spectral confinement. In fact, these random number noise-like waveforms generated in step 53 are wideband all the way to the Nyquist frequency.

Figure 9:
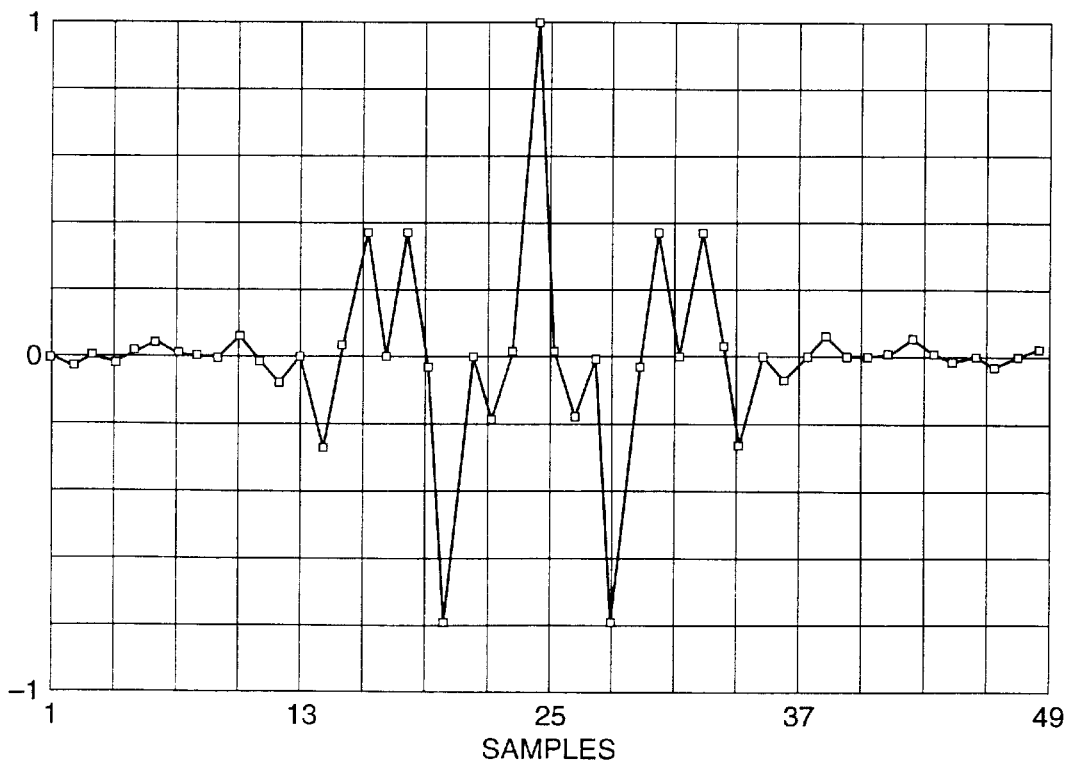
FIG. 9 is a graph illustrating the shaping function unit impulse response used to shape the noise-like random number sequences of FIG. 8 according to the first embodiment.
Figure 10:
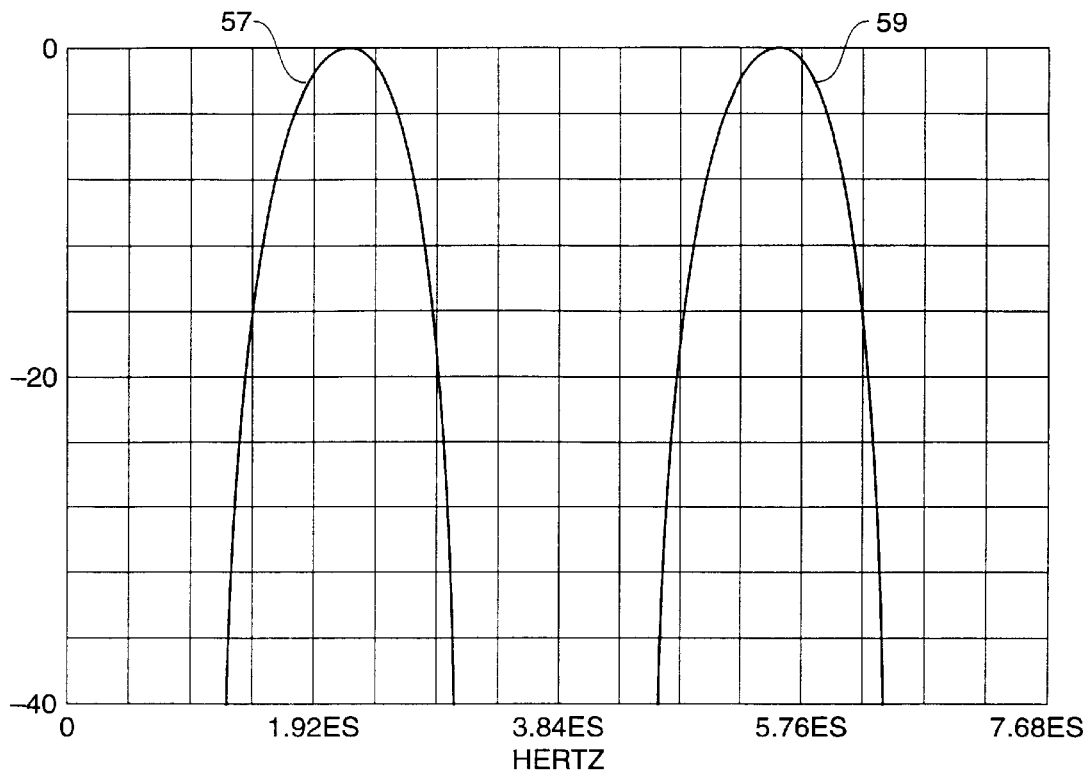
FIG. 10 is a graph illustrating the frequency response of the shaping function of FIG. 9 according to the first embodiment.

The next step 55 in generating a basis set of satisfactory waveforms is spectrally shaping each of the 48 sequences within the noise-like set of step 53 by way of a shaping function. An exemplary shaping function is illustrated in FIGS. 9–10, with FIG. 9 showing the shaping function unit impulse response in the time domain and FIG. 10 illustrating the frequency response (in the frequency domain) of the same shaping function. As shown, the shaping function is made up of about 48 samples.

The shaping function is a sequence which describes the approximate spectral confinement to which the 48 waveforms or sequences of the basis set must adhere. This function is represented as a unit impulse response as shown in FIG. 9, with a corresponding sample interval as shown (each interval of time being about 1/1536 MHz or around 800 nanoseconds in the first embodiment) The sample interval of the shaping function is the same as the sample interval for the noise-like waveforms in certain embodiments. The length of the shaping function varies according to the complexity of the desired bandwidth shaping requirements.

The shaping function may be determined by way of a variety of numerical techniques such as, e.g., the algorithms of frequency sampling, bilinear transformation, and equirripple approximation. In the first embodiment of this invention, the shaping function shown in FIGS. 9–10 was determined by the method of frequency sampling.

A significant characteristic of the frequency response of the shaping function as shown in FIG. 10 for the first embodiment of this invention is that a region of attenuation or void exists between two separate and spaced-apart passbands 57 and 59. Passbands or lobes 57 and 59 are centered approximately 150 kHz away from the spectral center of 384 kHz in the first embodiment of this invention, each passband being from about 75–150 kHz wide, most preferably about 100 kHz wide with tails out to about 150 kHz. Each passband in certain embodiments extends from about 100 kHz away from the center frequency to about 250 kHz away from the center frequency as shown and discussed later herein with respect to FIG. 19.

The void between passbands 57 and 59 of the shaping function permits the analog FM signal carrier is to be located at its center in the first embodiment, namely at the center frequency of about 384 kHz. Alternatively, any type of known colored interference may be disposed between lobes 57 and 59.

This void region between passbands 57 and 59 permits the rejection or extraction of the analog FM interference under modulation centered about the center frequency by the digital processing portion of the receiver. In analog FM applications, substantially the entire analog signal is disposed between and spaced from passbands 57 and 59. However, the possible presence of optional SCA subcarrier information necessitates wide frequency protection.

Figure 11:
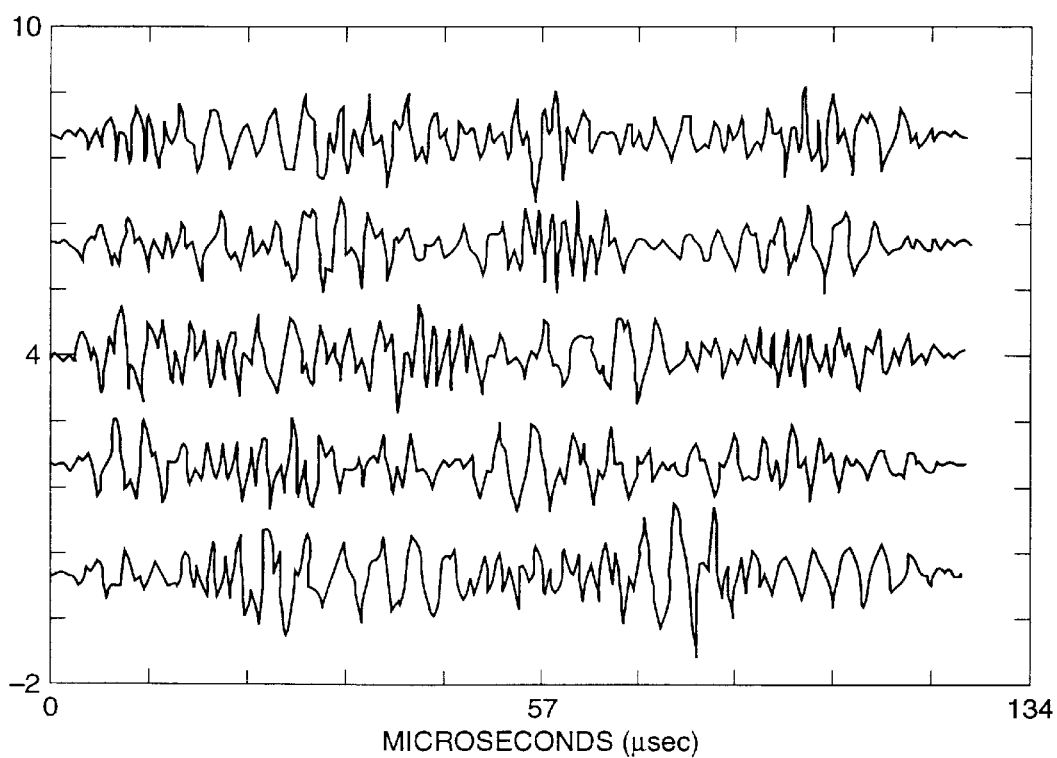
FIG. 11 is a graph illustrating the noise-like random number sequences of FIG. 8 after spectral shaping by the impulse response of FIG. 9 according to the first embodiment.

Each noise-like sequence of the set of 48, five of which are shown in FIG. 8, is mathematically convolved with the shaping function unit impulse sequence shown in FIG. 9 in order to generate the spectrally shaped set of 48 sequences, five of which are shown in FIG. 11, this Figure representing the five random noise sequences of FIG. 8 after the aforesaid convolving with the shaping function of FIG. 9. This convolving is a multiply and add type process where the noise-like sequences are somewhat filtered by the unit impulse shaping function.

Figure 12:
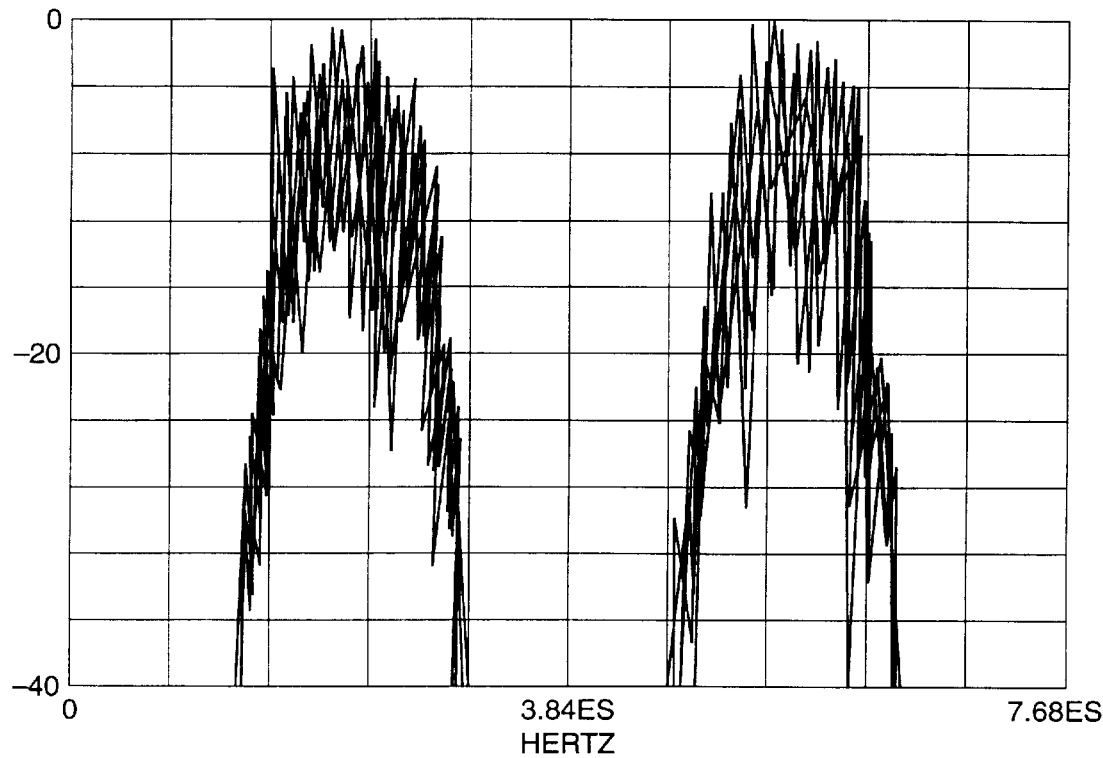
FIG. 12 is a graph illustrating the frequency response of the spectrally shaped noise-like sequences of FIG. 11 according to the first embodiment.

The spectrum with respect to frequency of the now shaped random number noise-like sequences is shown in FIG. 12. While the 48 (five of which are shown) sequences or waveforms now satisfy desired spectral compliance, they still have poor crosscorrelation properties. In other words, after spectral shaping of the FIG. 8 noise-like sequences, the sequences are not mutually orthogonal, although they do have good autocorrelation values.

Figure 13:
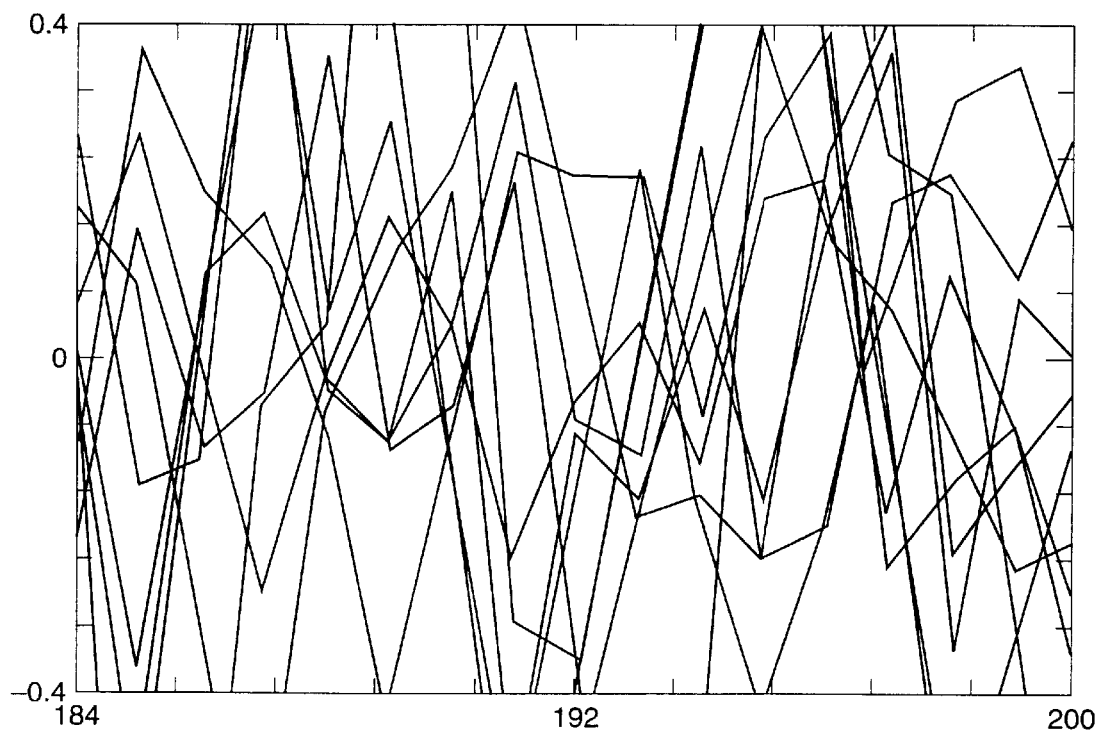
FIG. 13 is a graph illustrating the crosscorrelation or orthogonality characteristics of the spectrally shaped noise-like sequences or waveforms of FIGS. 11–12 according to the first embodiment.

FIG. 13 illustrates the less than desirable crosscorrelation characteristics of the spectrally shaped noise-like sequences or waveforms of FIGS. 11–12. If these signals were orthogonal (which they are not), all crosscorrelation terms arising from waveforms other than the one of interest would be about zero at the sampling point. This clearly is not the case with the sequences or waveforms shown in FIG. 13.

Figure 14:
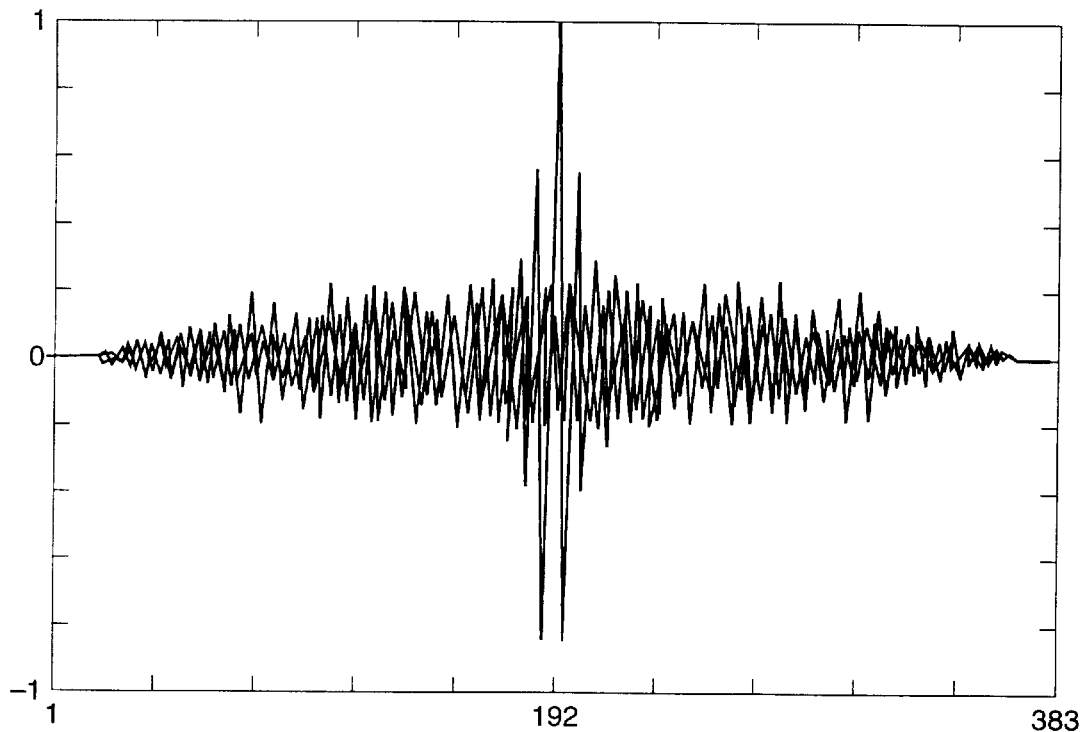
FIG. 14 is a graph illustrating the autocorrelation characteristics of the spectrally shaped noise-like sequences of FIGS. 11–12 according to the first embodiment.

FIG. 14 illustrates the satisfactory autocorrelation characteristics of the five of the 48 individual noise-like sequences shown in FIGS. 11–12. As illustrated, the shaped sequences have autocorrelation values which are at a maximum near about zero offset, and at a minimum at substantially all positive and negative time shifts Thus, the now spectrally shaped noise-like sequences must be improved with respect to their crosscorrelation values.

In order to improve the crosscorrelation characteristics of the spectrally shaped noise-like waveforms, five of which are shown in FIGS. 11–12, the sequences or waveforms are decomposed by way of the algorithm of singular value decomposition (SVD). This algorithm of SVD, also known as Principal Components Analysis, is described in *Numerical Recipes: The Art of Scientific Computing* by William H. Press, copyright 1986, pp. 52–64, the disclosure of which is hereby incorporated herein by reference.

SVD is based upon the theorem that any M×N matrix A, whose number of rows M is greater than or equal to its number of columns N, can be written as the product of an M×N matrix U, an N×N diagonal matrix W with positive or zero elements, and the transpose of an N×N orthogonal matrix V, with matrices U and V being column-orthonormal. The shapes of these matrices are illustrated by the tableau in Appendix B at the rear of the Specification.

The SVD algorithm routine "SVDCMP" listed in Appendix C at the end of the Specification is one way in which to perform SVD on an arbitrary matrix A, replacing it by U and returning matrices W and V separately. This routine SVD-CMP is based on a routine by Forsythe et al which is in turn based on the original routine of Golub and Reinsch found in various forms in Wilkinson and Reinsch, in LINPACK, and elsewhere. These references, hereby incorporated herein by reference, include extensive discussions of the algorithm.

In applying the algorithm of SVD to the spectrally shaped noise-like waveforms of FIG. 11 (and the other 43 waveforms), an oversampled or overdetermined matrix A is constructed by arranging in step 57 the spectrally shaped noise-like waveforms generated by generator 37 as columns of the matrix A, matrix A having M rows and N columns where the number of rows M generally being greater than the number of columns N in certain embodiments. Accordingly, the number of rows M represents the number of samples in a baud (or sequence), and the number of columns N represents the number of sequences or waveforms.

After constructing matrix A in such a manner, the matrix is decomposed in step 59 via SVD into the product of three additional matrices: U, W, and V.

$$A_{M,N} = U_{M,N} \cdot W_{N,N} \cdot V_{N,N}^T$$

Where $$A_{M,N} = \{\hat{a}_1^T \hat{a}_2^T ... \hat{a}_N^T\}, \quad \hat{a}_i = \{a_{1i} a_{2i} ... a_{Mi}\}$$
$$U_{M,N} = \{\hat{u}_1^T \hat{u}_2^T ... \hat{u}_N^T\}, \quad \hat{u}_i = \{\hat{u}_{1i} u_{2i} ... u_{Mi}\}$$
$$V_{M,N} = \{\hat{v}_{1T} \hat{v}_2^T ... \hat{v}_N^T\}, \quad \hat{v}_i = \{v_{1i} v_{2i} ... v_{Mi}\}$$

$$W_{N,N} = \begin{Bmatrix} w_1 & 0 & ... & 0 \\ 0 & w_2 & ... & 0 \\ 0 & 0 & ... & w_N \end{Bmatrix}$$

$$\langle \hat{u}_i, \hat{u}_i \rangle = 1, \quad \langle \hat{u}_i, \hat{u}_j \rangle = 0$$
$$\langle \hat{v}_i, \hat{v}_i \rangle = 1, \quad \langle \hat{v}_i, \hat{v}_j \rangle = 0$$

The decomposition of matrix A by using SVD creates matrix U which possesses M rows and N columns (matrix U is the same size as matrix A), wherein the columns of matrix U are orthogonal in pairs. In other words, the left-most 48 columns of newly formed matrix U represent the basis set of sequences or waveforms in the first embodiment, these sequences all being substantially mutually orthogonal. Furthermore, each column of matrix U has unit vector norm (orthonormal). The left-most 48 columns of matrix U are sequences that represent the basis set of desired waveforms being mutually orthogonal, spectrally shaped, and having good autocorrelation values. Additional matrices W and V may be disregarded. The crosscorrelation/autocorrelation ratio of these waveforms is less than about 0.003, and more preferably less than about 0.001.

Because the number of columns N in matrix U is typically greater than the number of waveforms or channels (e.g. 48) required for the basis set, only as many columns as needed are selected, starting with the left-most column of matrix U and proceeding to the right. In the event that there are insufficient degrees of freedom due to a small time-bandwidth product, some waveforms, particularly those toward the right-most column of matrix U, may not satisfy the spectral confinement requirement of the desired application. In such a case, it may be necessary to alter the shaping function or-increase the baud interval.

Figure 15:
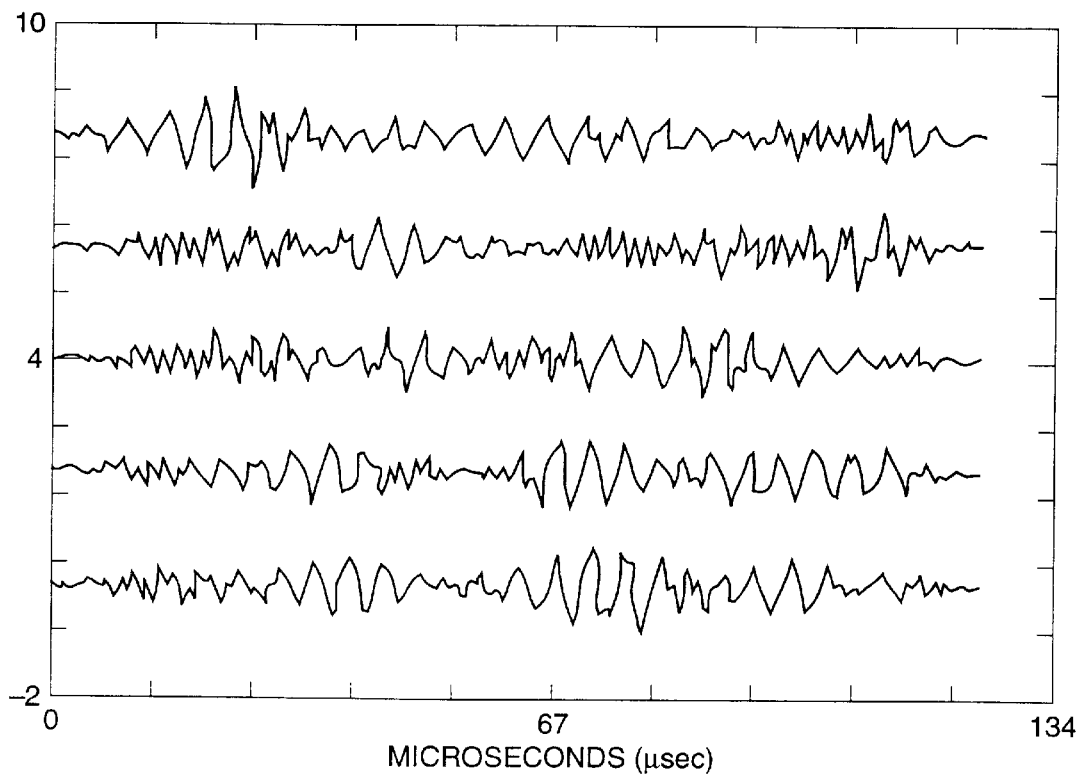
FIG. 15 is a graph illustrating the determined spectrally shaped noise-like, orthogonal sequences or waveforms after SVD matrix decomposition according to the first embodiment.
Figure 16:
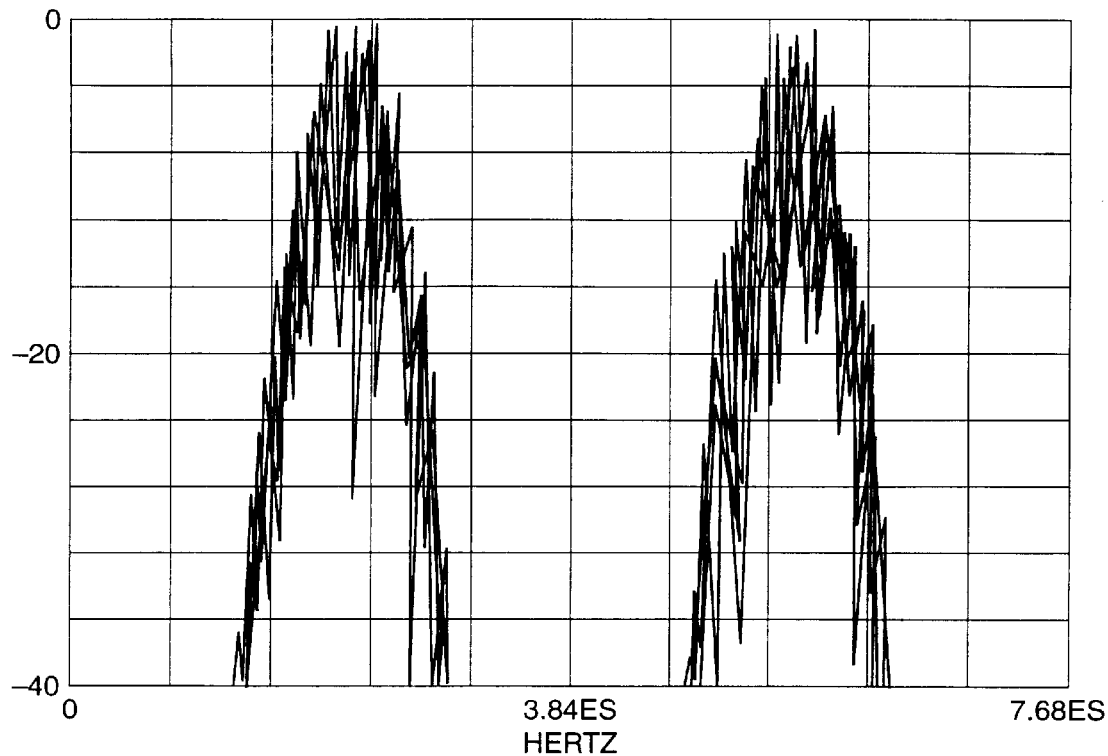
FIG. 16 is a graph illustrating the frequency response of the noise-like sequences or waveforms of FIG. 15 after SVD decomposition according to the first embodiment.

FIG. 15 illustrates the spectrally shaped sequences of FIG. 11 after they have been decomposed via SVD as described above, this set of 48 wideband noise-like waveforms (five of which are shown) now being orthogonal, spectrally shaped, and having good autocorrelation properties. The frequency responses for the five waveforms of FIG. 15 formed in step 59 are illustrated in the graph of FIG. 16. As shown, the decomposition of the waveforms via SVD, while providing good cross-correlation characteristics to the basis waveform set, did not adversely affect its spectral or autocorrelation characteristics.

Figure 17:
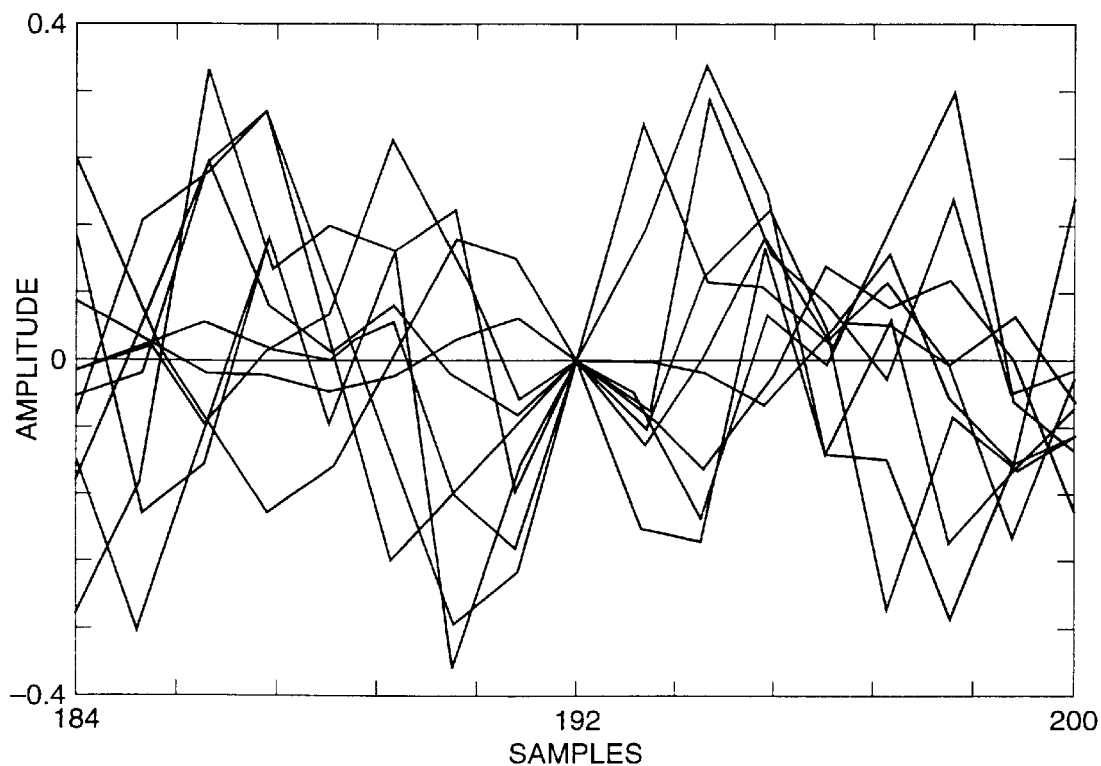
FIG. 17 is a graph illustrating the cross correlation characteristics of the noise-like sequences or waveforms of FIGS. 15–16 according to the first embodiment.

FIG. 17 illustrates the cross-correlation (or orthogonality) characteristics of the basis SVD decomposed waveforms shown in FIGS. 15–16. The crosscorrelation sequences at the sampling point 192 are all near zero as shown in FIG. 17, thereby illustrating the orthogonal properties of the noise-like sequences or waveforms of FIGS. 15–16.

While the 48 waveforms in the first embodiment output from generator 37 are substantially orthogonal at the sampling point, they often are not perfectly orthogonal due to noise and limited A/D converter resolution in certain embodiments.

As shown, for the wideband signals, the crosscorrelation can only be near zero near the sampling point and not at all points in time because of the common frequencies occupied by the wideband signals or carriers.

Figure 18:
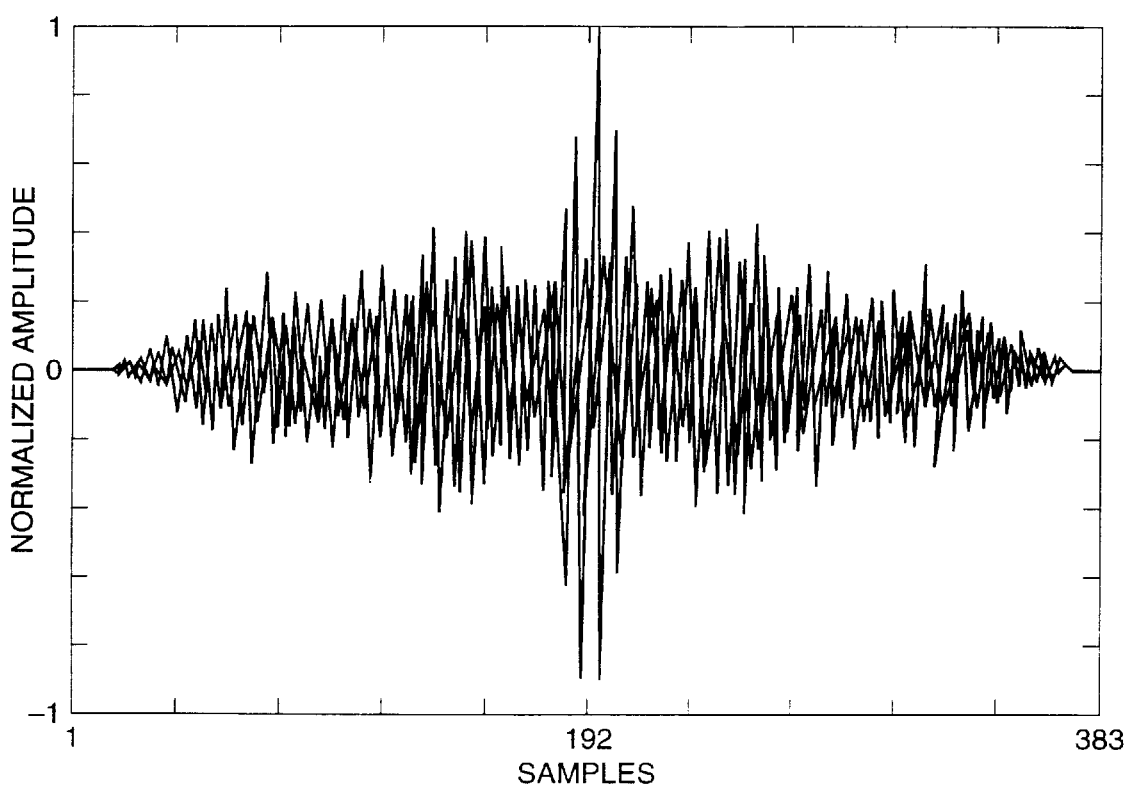
FIG. 18 is a graph illustrating the autocorrelation characteristics of the noise-like sequences or waveforms of FIGS. 15–17 according to the first embodiment.

FIG. 18 illustrates the auto-correlation values of the five sequences illustrated in FIG. 15. Again, the illustrated autocorrelation values are excellent, in that the autocorrelation is at a minimum for both positive and negative time shifts and at a maximum for about zero offset.

Thus, it has surprisingly been found that the application of the algorithm of singular value decomposition (SVD) to the spectrally shaped non-orthogonal waveforms of FIG. 11 results in a basis set of waveforms or sequences which are substantially orthogonal while the spectral shaping and autocorrelation values are maintained throughout the application of SVD.

Although SVD has been used in the past in the solution of least squares problems, it has never to the best of the instant inventors knowledge been utilized for determining signal waveforms in data communication applications.

With respect to the autocorrelation and crosscorrelation values of the basis set, we will utilize the crosscorrelation/autocorrelation ratio to define what we mean by good or satisfactory autocorrelation and crosscorrelation. This ratio herein relates to the performance of channel(s) in realistic hardware implementations because while the mathematical crosscorrelation characteristics are perfect, they are typically physically unrealized because they would require infinite precision to satisfy such perfection. In the first embodiment of this invention, for BPSK data modulation, the probability of error is (reference: Lindsey, W. C., and M. K. Simon, *Telecommunication Systems Engineering*, 1973):

$$P_e \le Q\left[\sqrt{\frac{2E}{N}}\right]$$

Where E is the bit energy and N is the noise energy. In the first and/or second embodiments herein, the measured $P_e$ is less than $1 \times 10^{-8}$ in the absence of noise other than the channel-to-channel interference. Through iterative solution of the equation, E/N is thus found to be no less than 16. E may be considered the peak autocorrelation sum of any basis waveform (its energy), while N is the additive crosscorrelation contributions of each of the remaining 47 basis sequences which are acting as sources of interference. Hence the crosscorrelation/autocorrelation (or cross/auto) ratio is less than 1/(16*47) or 0.001 for each waveform pair. In certain embodiments, a bit error rate of better than $1 \times 10^{-4}$ is maintained, this corresponding to a maximum cross/auto ratio of about 0.003. Thus, the systems according to certain embodiments of this invention have cross/auto ratios of less than about 0.003 and preferably less than about 0.001.

The crosscorrelation characteristics typically dominate channel performance because the 48 channels act as source of interference with respect to each other. In the absence of MP, autocorrelation is not as important, autocorrelation primarily reflecting the "whiteness" or broadness of the frequency content of the basis waveforms.

FIGS. 7–18 illustrate the generation of a basis wideband noise-like waveform set by basis sequence or waveform generator 37. Without further encoding, the 48 basis waveforms of each set representing different symbols would not vary from baud to baud, hence only a constant bit sequence would be communicated because the same set of 48 waveforms are output each baud. Thus, the basis waveform shapes making up the set must be modified or modulated in a data dependent manner for use in the communication system of the first embodiment.

Modulator/multiplier 39 of FIG. 2 modulates the incoming basis waveforms output by generator 37 in a data dependent manner in accordance with the digital data coming in at a rate of 384 kbit/sec from error correction encoder 35.

In order to maintain the desired properties of crosscorrelation, autocorrelation, and spectral shape, variable gain modulation including the special cases of inversion (generally considered as phase modulation) and infinite attenuation is utilized by modulator 39. Thus, modulator 39 may apply, for example, binary phase-shift-keying (BPSK) or M-ary orthogonal modulation to the basis waveforms in certain embodiments.

For the two-level case of phase-shift-keying (PSK or BPSK), one state represents the binary "1" and the other state a binary "0". For multilevel or M-ary systems, there are more than two levels or states, usually a multiple of two, with a few exceptions such as partial response systems, duo-binary being an example.

Phase modulation such as PSK or BPSK uses one phase of the carrier frequency or waveform for one binary state, and the other phase for the second binary state. The two phases are about 180 degrees apart in certain embodiments, and are detected at the receiver by a synchronous detector using a reference signal at the receiver which is of known phase with respect to the incoming signal.

Alternatively, offset quaternary phase-shift keying (OQPSK) modulation may be performed at modulator 39. OQPSK is based upon the 90 degree carrier phase 4 separation of two sets of sequences, so the two sequences are interleaved in time. One set of sequences is denoted as the in-phase set, and the remaining sequences are denoted as the quadrature set. When OQPSK is used, a reduced set (e.g. 24) of basis sequences is generated by generator 37 by considering only one-half the spectrum. Hence, the spectral shaping function is considered symmetric about a midpoint, which is translated to zero frequency. For example, in certain embodiments, the shaping function is degenerated to a single passband 100 kHz wide and centered about 150 kHz away from zero frequency. The in-phase waveforms are defined from the basis set waveforms, and the quadrature waveforms are constructed by time-reversing the in-phase waveforms. However, they may also be identical to the in-phase waveforms.

In the first embodiment of this invention, waveform generator 37 outputs an orthogonal basis set of 48 waveforms or sequences to modulator 39 at a baud rate of about 8 kbit/sec, each sequence or waveform of the set being unique and representing a different channel or carrier At modulator 39, the 48 waveforms are each individually multiplied by either a positive 1 (+1) or a negative 1 (−1) in the bi-valued phase modulation process, a sequence multiplied by +1 representing a binary 1 and a sequence multiplied by −1 representing a binary 0.

After being modulated in modulator 39 so that each waveform in the set represents either a binary 1 or 0, all 48 waveforms making up the baud are combined at summer 43 with a wideband reference signal to be described below. Thereafter, generator 37 again outputs the same 48 basis sequences to modulator 39, which modulates this newly sent baud in the same manner. Thus, a substantially continuous flow of bauds (each baud including 48 data channels or carriers) is output from modulator 39 to summer 43, with the 48 signals of each baud along with a reference signal from generator 41 being combined and thereafter forwarded to digital-to-analog converter 45.

When modulator 39 of the first embodiment receives a waveform from generator 37 and is instructed by the incoming digital data to modulate this waveform to represent a binary zero, modulator 39 multiplies all 192 samples of this waveform by −1 and thereafter sends the modulated waveform to summer 43. Thus, the actual shapes of the waveforms received from generator 37 are not changed in modulator 39, only their polarity is changed.

In certain embodiments, the 48 basis waveforms or sequences making up the orthogonal basis set which is output from generator 37 are determined by way of SVD as described above. However, once a satisfactory set of 48 waveforms has been determined, this set is stored in generator 37 and is repeatedly generated and output by software (or alternatively hardware). In a similar manner, reference signal generator 41 determines a satisfactory signal and repeatedly outputs the same stored wideband reference signal to summer 43 for each baud.

The wideband reference signal output by generator 41 is unmodulated, and is not related to the data signals output from modulator 39. The reference signal is a noise-like waveform composed of the summation of all of the basis functions (e.g. 48), each basis function having either a positive or negative polarity determined arbitrarily in certain embodiments.

The reference signal is the same for every baud, and satisfies the bandwidth occupancy determined by the system The reference signal is scaled down in amplitude with respect to the modulated waveforms of each baud.

To generate the reference signal, an arbitrary binary value is picked for each of the 48 basis waveforms in the particular set output from generator 37, these modulated waveforms then being summed together to represent a composite signal. The composite signal is then attenuated so as to represent from about one-quarter to one-half the amplitude of each of the 48 signals emitted from modulator 39. As discussed above, the reference signal of reduced amplitude is combined with each set of waveforms emitted from modulator 39 at summer 43. The crosscorrelation of the reference signal is about 1/48 for any one waveform in the signal set.

There is a trade-off associated with reducing the amplitude of the reference signal. Increasing reference signal power reduces the number of averages required in the receiver which thereby makes it possible to use a faster equalizer. The nominal trade-off in certain embodiments is about 50 averages and about one-half reference signal power or amplitude with respect to the amplitude of the modulated waveforms.

Because multipath (MP) and colored interference may impact some channels more than others, the reference signal is composed of all 48 channels. The reference signal is constant in every baud, so that it must be subtracted from each baud at the receiver before the demodulation step is performed. Additionally, while the selection of polarity for each channel or carrier in making up the reference signal is somewhat arbitrary when BPSK modulation is used, such is not the case with M-ary or on-off modulation.

The composite digital signal output from summer 43 is converted to analog by D/A converter 45. Alternatively, 48 separate and distinct digital-to-analog converters may be disposed immediately after modulator 39, and summer 43 would then be of the analog type.

The signal output from D/A converter 45 is at an intermediate frequency (IF) of about 384 kilohertz in the first embodiment. The frequency of the signal is moved up to the desired final FM frequency by way of upconverter 47 and local oscillator (LO) 49. This upconversion is an analog process performed on the combined 48 data channels and reference signal of each baud. After being upconverted, the signal is linearly amplified via amplifier 51, and forwarded to FM and digital signal summer 9.

Signal summer 9 linearly combines the analog FM signal output from clipping amplifier 27 with the digital data signal output from linear amplifier 51. After being linearly combined at summer 9, the composite FM/digital signal is sent to transmitting antenna 29 for broadcast through atmospheric-free space to a plurality of receivers 3.

Figure 19A:
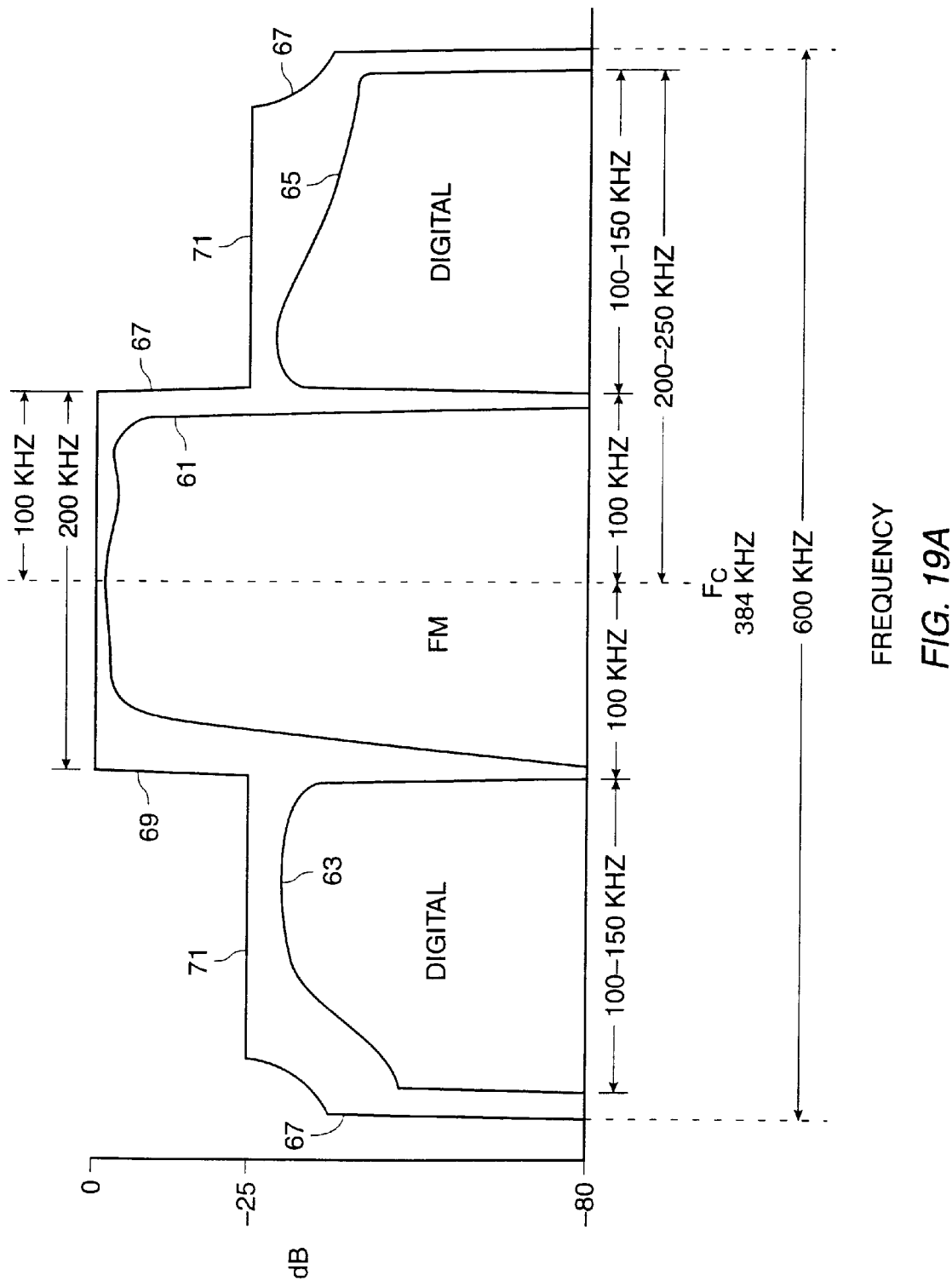
FIG. 19(a) is a spectral diagram illustrating the spectral allocation of the digital and analog FM signals as linearly summed and transmitted over atmospheric free space according to the first embodiment.

FIG. 19(a) is a graph illustrating the spectral allocation of the composite FM/digital signal. As shown, analog FM signal 61 (or other type of colored interference present in other embodiments) is substantially centered about the center frequency of 384 kilohertz (kHz) in this particular embodiment, FM signal 61 being surrounded on either side by digital passband signals 63 and 65 made up of the modulated waveform set. While passbands 63 and 65 are illustrated as being substantially symmetrical, this need not be the case in certain embodiments although they are substantially symmetrical about the center frequency in the first embodiment.

Spectral mask 67 defines the spectral limitations within which the composite FM/digital signal must stay, mask 67 being about 600 kilohertz wide and 80 decibels (dB) deep in this embodiment. Mask 67 includes a central peak portion 69 and a pair of guardbands 71 immediately adjacent the central portion. Guardbands 71 are side areas where low level conventional analog FM signals are typically disposed because the typical analog FM signal cannot be attenuated in 0 bandwidth, mask 67 being a typical analog FM mask. As shown, guardbands 71 start out at about −25 dB from peak power and about 100 kilohertz (kHz) away from the center frequency. The amplitude of the guardbands is reduced to −80 dB at 300 kHz away from the center frequency on either side.

Because typical analog FM broadcasting stations generally do not utilize guardband portions 71 of mask 67, the digital signals of the first embodiment are spectrally shaped so as to be disposed within these guardband areas. Digital signals (or lobes) 63 and 65 are of significantly reduced amplitude as compared to FM signal 61 due to their positions in the guardband areas in this embodiment, each of the 48 different symbol waveforms in each baud representing portions of signals 63 and 65. Also, the top sides of lobes 63 and 65 are bumpy or jagged in certain embodiments. Additionally, digital signals 63 and 65 (which may or may not be symmetrical about the center frequency) are both spaced about 100 kHz from the center frequency in this embodiment, so as to reduce the possibility of interference between the FM and digital signals.

While many of the functions of the aforediscussed transmitter elements may be carried out via the first embodiment transmitter, such functions may also be carried out using hardware of a second embodiment. FIG. 19(b) is a hardware block diagram of a transmitter according to a second embodiment The signal in this embodiment is directly modulated at the final RF carrier frequency by sending the samples from the MAC to two D/A converters in alternating succession (i.e. one for the I D/A converter, the next for the Q D/A converter, etc.) and using a hybrid I/Q modulator.

Figure 19B:
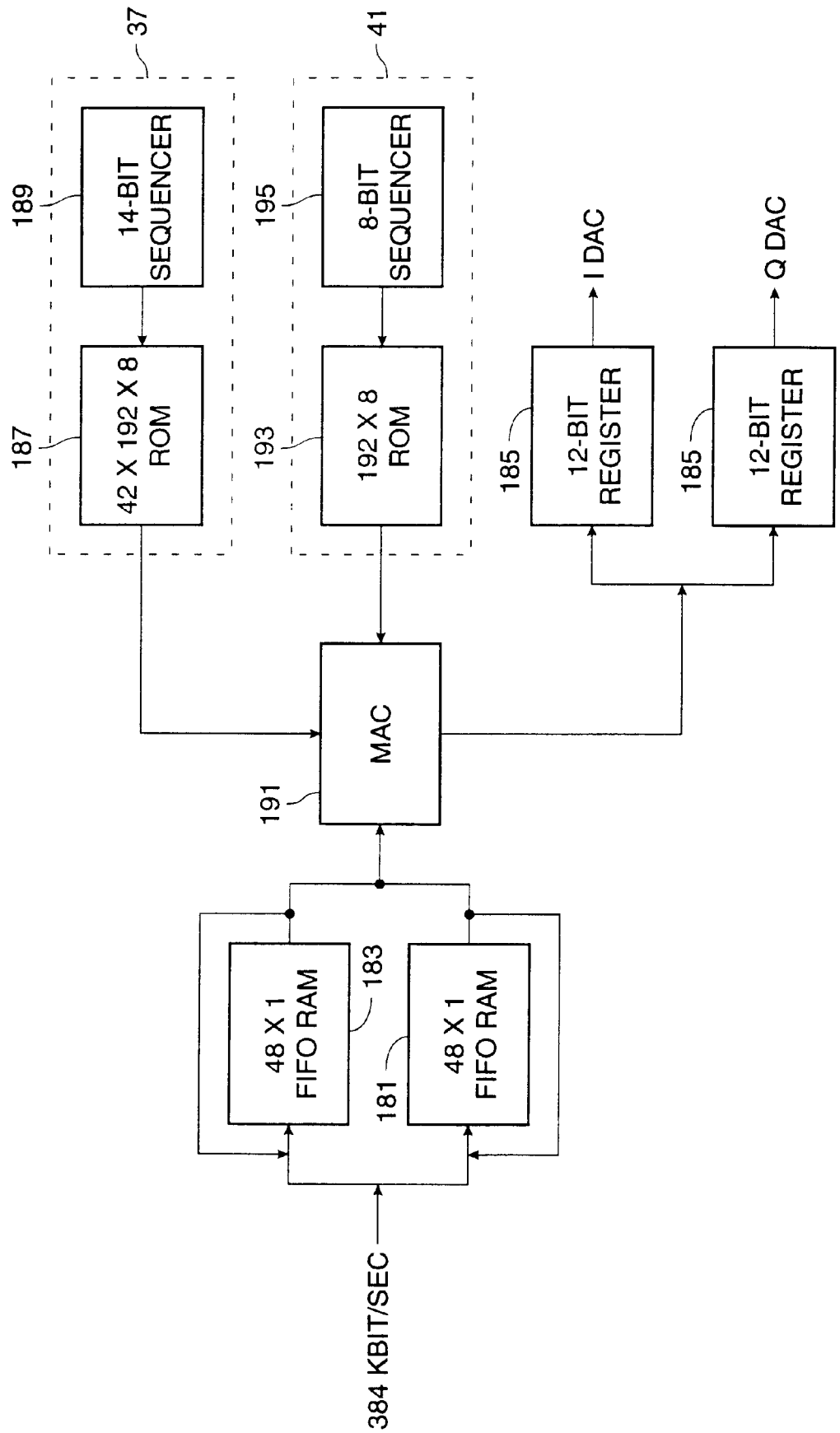
FIG. 19(b) is a block diagram of a portion of the transmitter according to a second embodiment.

In FIG. 19(b), the input bit stream is at about 384 kHz and is a combination of MUSICAM compressed digital audio from compressor 33 and ECC from encoder 35. This bit data is read into one of two 48 bit FIFO 48×1 RAMS 181 and 183. The total throughput at registers 185 is about 1.536 MHz which corresponds to the basis waveform sample interval. This throughput is implemented with in-phase (I) and quadrature (Q) D/A converters (not shown) to which the samples are alternatively sent in succession (i.e. one for the I D/A converter, one for the Q D/A converter, next for the I, etc.).

The above-discussed basis orthogonal waveform set of 48 different sequences is stored in RON 187 which is indexed column by column with a modulo 9216 address sequencer 189. Thus, the first 48 matrix elements indexed correspond to the first sample of each basis waveform The value of each of the 48 data bits must be accessed 192 times (corresponding to the number of samples in a baud or waveform) in a single baud to generate the modulated waveforms. Therefore, RAMs 181 and 183 are accessed/read in a circular fashion. A master crystal 6.144 MHz clock generator (not shown) is divided down to generate the 384 kHz bit clock, the 1.536 MHz sample clock, and the 768 kHz D/A converter clocks.

Modulation is done in MAC 191 which may be operated as an additive or subtractive accumulator. MAC 191 is fast enough to complete 48 MACs in a sample interval (i.e. about 1.536 MHz), otherwise multiple MACs are required which may be the case in certain embodiments. At the start of each sample interval, MAC 191 is preloaded with the value of the reference signal for that sample, the wideband reference signal discussed above being stored in ROM 193 and indexed with modulo 192 counter 195. The pointer to ROM 193 is reset at the start of each baud to the first sample in the ROM 193 so as to index the first value for the reference signal.

For each of the 48 data bits in RAMs 181 and 183 corresponding to the previous baud, if the incoming bit is a 0 the indexed value of ROM 187 which represents a channel waveform sample is subtracted from the current value. However, if the data bit is a 1, the indexed sample value of ROM 187 is added to the current value. After 48 MACs, the contents of the accumulator represent the complete sample, i.e. the sum of modulated channel waveforms and reference signal. The contents are then latched into one of 12-bit registers 185, alternating from one sample to the next. Registers 185 are used to drive D/A converters 197 shown in FIG. 19(c).

Figure 19C:
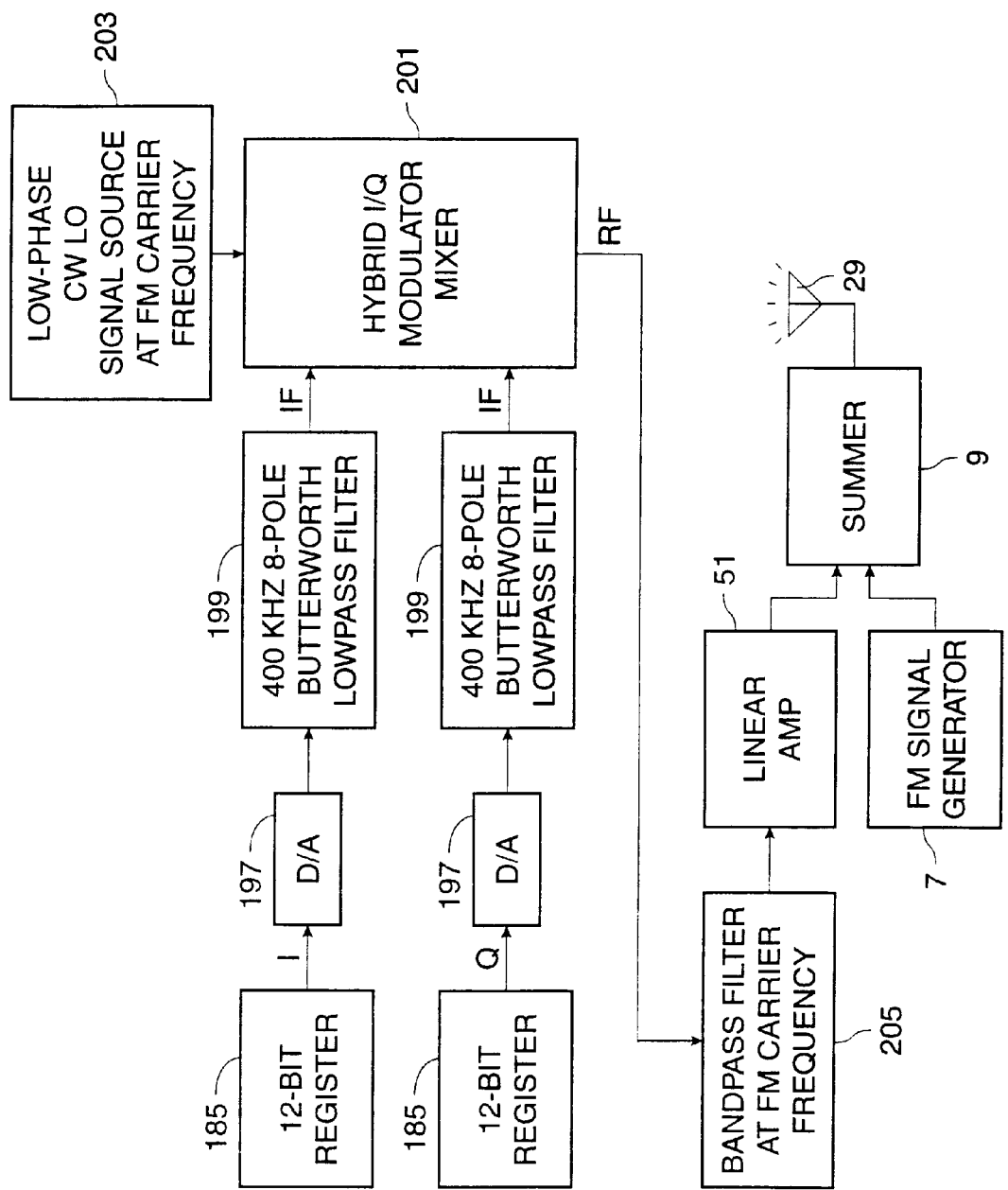
FIG. 19(c) is a block diagram of another portion of the FIG. 19 (b) transmitter.

FIG. 19(c) is a hardware block diagram of certain analog digital signal generator components which may be used according to the FIG. 19(b) embodiment of the transmitter. The output of D/A converters 197 is filtered by 400 kHz 8-pole Butterworth lowpass filters 199. D/A converters 197 are used to drive hybrid I/Q modulator mixer 201, which may be a Minicircuits MIQA-100 in certain embodiments.

Local oscillator source 203 for quadrature mixer 201 is of the high stability, low phase, CW type operating at the same frequency as the analog FM carrier. Bandpass filter 205 removes undesired sidebands and amplifier 51 is a linear power amplifier.

Figure 20:
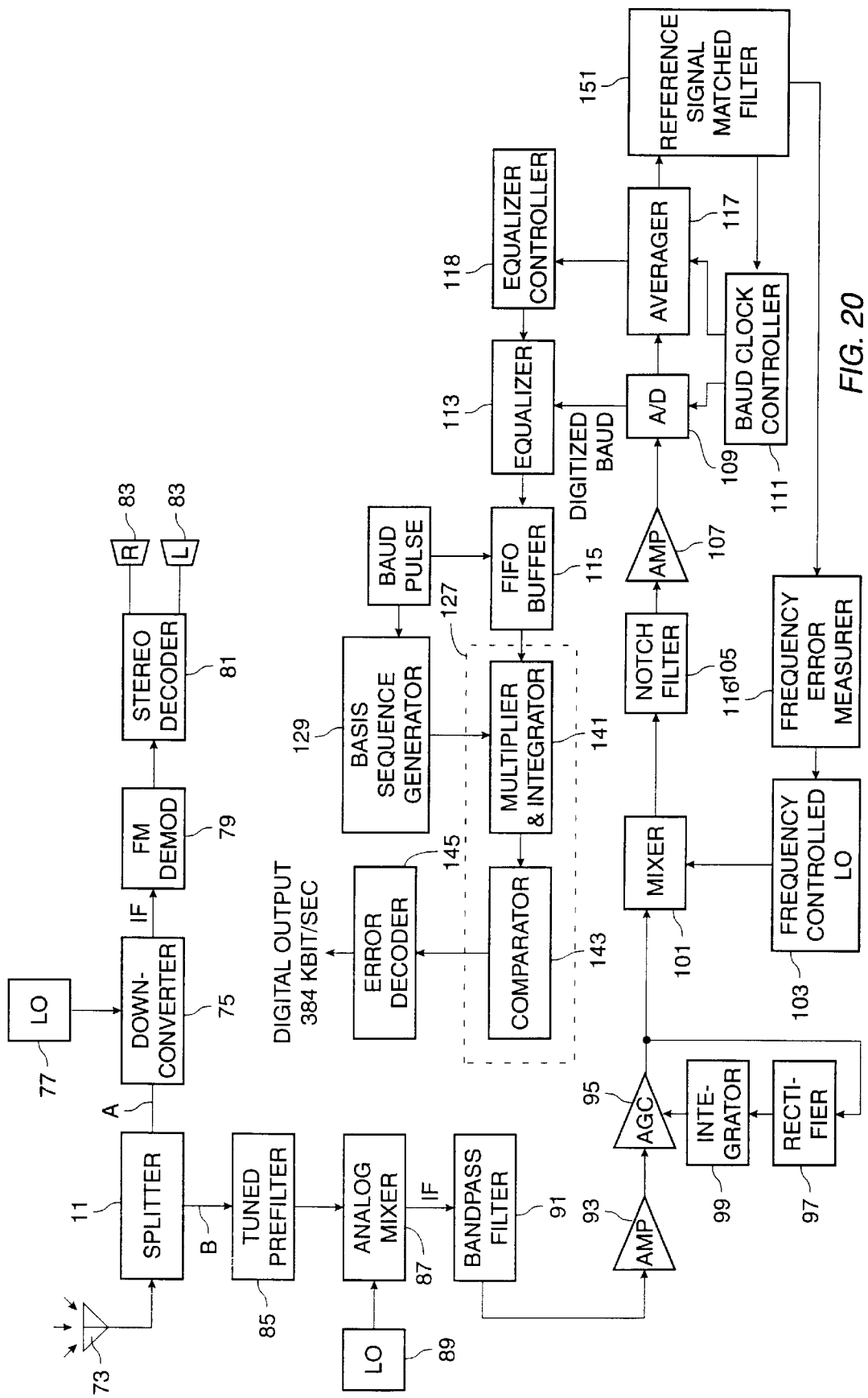
FIG. 20 is a block diagram illustrating the receiver of the first embodiment of this invention.

After being transmitted by way of antenna 29, the composite FM/digital signal, whose spectral allocation is shown in FIG. 19(a) for certain embodiments, is received by omni-directional antenna 73 in receiver(s) 3 as best shown in FIG. 20. The received composite FM/digital signal is at an RF frequency in the very high frequency (VHF) range from about 30–300 MHz and more preferably from about 88–110 MHz.

The incoming composite signal is split into two separate FM/digital paths, A and B, by splitter 11, the composite signal in path A being forwarded to the analog FM signal processing section of receiver 3 and the composite signal in path B being forwarded to the digital signal processing portion of the receiver.

Alternatively, the receiver may be a purely digital receiver without splitter 11, or a purely analog FM receiver with no digital processing circuitry.

With respect to signal path A, the analog FM signal of the composite is downconverted to a standard intermediate frequency (IF) by downconverter 75 and local oscillator 77. The output of downconverter 75 is forwarded to conventional frequency demodulator 79. The resulting signal is forwarded from demodulator 79 to conventional stereo decoder 81 for output via typical audio speakers 83.

Alternatively, the analog FM and digital FM portions of the receiver may share the same downconverter in certain embodiments, realizing, however, that the analog bandpass filter is generally more selective or narrow than the digital bandpass filter.

Splitter 11 outputs the other FM/digital signal via signal path B toward tuned prefilter 85 which makes the first attempt at separating the desired composite signal from interfering transmissions originating from other stations. Thus, the RF signal is received at antenna 73 and transformer coupled to prefilter 85, prefilter 85 including a bandpass filter eliminating all signal components except those in the FM band, and a high gain, low-noise amplifier. Alternatively, the bandpass filter within prefilter 85 may be replaced with a more selective filter that discriminates against all FM carrier frequencies other than that of interest, or optionally a series of switched bandpass filters that together span the entire FM band.

The low-noise amplifier of prefilter 85 amplifies a fairly weak FM signal level, approximately 20 dBF (dB-Femtowatts) in magnitude, to a level of −40 dBm where it may be processed readily by further circuits. This amplifier is linear in certain embodiments so as to preserve the digital signal.

The low-noise amplifier of prefilter 85 is followed by a high dynamic range diode-ring mixer 87 which frequency translates the FM/digital signal from the RF carrier frequency to a fixed intermediate frequency (IF) of about 10.7 MHz. The choice of IF is generally dictated by the availability of inexpensive IF bandpass filters and may, of course, vary with respect to the use of the system. Local oscillator (LO) 89 of mixer 87 is sinusoidal in nature, having a frequency which is the addition of the IF frequency and the desired RF carrier frequency. Local oscillator 89 is variable due to the requirement for tuning over the entire FM band, but once a station is selected, the frequency of LO 89 is generally not altered.

The signal at an IF of 10.7 MHz emitted from mixer 87 is forwarded to high order, 500 kHz wide bandpass filter 91 which is centered at the IF frequency. Bandpass filter 91 separates the composite FM/digital frequency or signal from possible nearby adjacents so as to limit the noise bandwidth of the system. The bandwidth of bandpass filter 91 is significantly wider than that employed in conventional FM receivers because it passes the digital signal which surrounds the centrally located analog FM signal, the opposing lobes 63 and 65 making up the digital signal in this embodiment being situated within guardbands 71 of FM mask 67.

The bandpass filter signal is then amplified by amplifier 93 and passed through automatic gain control (AGC) amplifier 95 so as to present a uniform signal level to the final downconversion circuits. The time constant of the AGC circuit, including rectifier 97 and integrator 99, must be significantly longer than the baud interval (about 125 microseconds in certain embodiments), but short enough to adapt to travel transients (less than about 10 milliseconds in certain embodiments)

The composite FM/digital signal is then sent to mixer 101 which is controlled by frequency controlled local oscillator 103. LO 103 controls the carrier frequency of the receiver. mixer 101 frequency translates the 10.7 MHz FM/digital intermediate frequency signal down to about a 384 kHz intermediate frequency (IF) FM/digital signal, the 384 kHz IF signal then being digitized and processed. The frequency of local oscillator 103 for mixer 101 is under direct control of the receiver in order to eliminate frequency offsets and to track Doppler frequency shifts as discussed later herein, this control being effected by focusing in on frequency shifts and not phase.

After being downconverted to the 384 kHz IF by mixer 101, the signal is forwarded to triple-tuned notch filter 105 which is centered at about the 384 kHz intermediate frequency Notch filter 105 substantially eliminates the analog FM component of the composite FM/digital signal, the analog FM component being irrelevant to reception and processing of the digital signal made up of lobes 63 and 65. Remaining portions of the analog FM signal which are not removed by notch filter 105 are suppressed by filtering within later stages of the receiver.

The resulting digital signal emitted from notch filter 105 is amplified by amplifier 107 to a level of about 200 mV in the absence of any interference, and is thereafter connected to analog-to-digital (A/D) converter 109 of receiver 3.

After the analog FM component has been removed, the signal is digitized with 10-bit analog-to-digital converter 109, sampling at approximately 1.536 MHz. The precise frequency of A/D converter 109 is controlled by the baseband or baud clock recovery voltage controlled oscillator within controller 111, the precise frequency of this oscillator/clock being controlled in order to accurately track the baud frequency of the transmitter.

The nominal amplitude presented to A/D converter 109 is chosen to allow for a nominal dynamic range of about 20 dB with about a 15–20 dB dynamic range overhead in order to combat adjacent channel and residual FM interferences. Over-range recovery must be less than one microsecond ($\mu s$) in duration in certain embodiments so as to provide good performance in the presence of impulse noise.

FIG. 21(*d*) is a block diagram of a hardware system which may be used to process and demodulate the digitized signal following its digital conversion by converter 109 in certain embodiments of this invention. Alternatively, may instead (or in combination) be used in place of certain elements illustrated in FIG. 21(*d*).

Assuming utilization of the hardware shown in FIG. 21(*d*), the now digitized samples are passed from A/D converter 109 through 36-tap equalizer 113 implemented as a direct-form finite impulse response (FIR) filter. It is noted that there must be enough taps in the equalizer to span the expected multipath delay range (5–30 microseconds for VHF). Thirty-six taps at 1.536 MHz means that the equalizer in this embodiment spans 23 microseconds. The maximum number of taps would be the number of samples in a baud (e.g. 192) but this usually is not practical.

The FIR filter of equalizer 113 is implemented with a fast MAC hardware unit 114. The speed of MAC unit 114 is such that 36 MACs are performed in 1/1.536 MHz, namely the amount of time between digitized samples. Alternatively, the MAC function may be interleaved among multiple MAC hardware units in order to reduce the throughput requirement for each individual MAC.

The delay memory for the FIR filter in equalizer 113 and the tap weight co-efficients are stored in recirculating first-in first-out RAM queues (FIFOs) 116 which have 10 bit widths. Concurrent with each analog-to-digital conversion at converter 109, MAC unit 114 within equalizer 113 is cleared and preloaded, and the oldest sample from the delay FIFO 116 is dropped. The tap weights of equalizer 113 are sequentially updated by a tap update algorithm 118 such as LMS. Other tap update algorithms such as Levinson-Durbin and Recursive Least Squares may also be used in certain embodiments.

MAC 114 of equalizer 113 (other MAC's herein are similar) is defined as a multiply/accumulate hardware unit. It requires two input bit operands, designated X and Y, and produces a single output operand. The MAC is implemented with parallel adders and therefore produces the output operand after a fixed-time interval, having been triggered by a clock pulse. The output operand is defined as the twoscomplement bit-wise product of the two input operands summed with the previous value of the accumulator. The new output operand is returned to the accumulator for the next operation.

The MAC accumulator may be cleared (reset to zero) upon the exertion of an external clear line (not shown). Additionally, the accumulator of MAC 114 may be preloaded to one of the input operands, arbitrarily chosen as the Y operand, upon the exertion of conventional load line 120. For details of a typical MAC integrated circuit, see the IDT7210L data sheets from Integrated Device Technology, Inc., Santa Clara, Calif., this MAC hardware unit being used to implement filtering and correlation functions with the minimum width of the bit operand required varying according to how the MAC is used. The operand bit widths are shown in FIG. 21(*d*).

Tap algorithm update unit 118 is continuously updated with both the output of averager 117 and equalizer averager 122 in accordance with the Least Means Square Algorithm (LMS) used by unit 118. Tap update algorithm 118 (FIG. 21(*d*)) and equalizer controller 118 (FIG. 20) are equivalent.

The equalizer update algorithm makes use of the averaged reference signal in order to determine the effect of the RF channel propagation characteristics The receiver has access (i.e. stored in a ROM) to the true, unimpaired reference signal, and hence it may apply one of the algorithms disclosed (e.g. LMS, Levinson-Durbin, etc.) in order to set the equalizer tap weights so as to linearly process the disturbed reference signal to more closely resemble the true reference signal. In the process, this "undoing" of the multipath disturbance also serves to compensate the modulated data waveforms since those signals are subject to the same propagation disturbances as the reference signal.

In addition to being processed through equalizer 113, the digitized baud samples are also routed from A/D converter 109 to reference signal averager 117. Averager 117 includes a 192- element memory with an 8-bit width which reflects the number of digitized samples in one baud (8 kilohertz baud rate at 1.536 MHz).

Reference signal averager 117 takes each of the 192 samples per baud and statistically averages them across multiple bauds (typically about 50 bauds) so that random variations in the samples with respect to data waveforms are eliminated thus leaving the bias making up the reference signal output from generator 41. Averager 117 includes a single-pole infinite-impulse response (IIR) filter which is implemented with a MAC hardware unit. The throughput of this MAC unit is modest, because it need only update once per digitized sample.

In order to facilitate operation of the equalizer tap update algorithm 118 and in order to remove the bias of the reference signal from the equalized digital samples, the equalized samples are averaged with the 192-element memory within averager 117. This function is time-interleaved with the same MAC unit.

The number of baud averages (e.g. about 50) is significant to proper performance, because if an insufficient number of bauds are averaged, the random data-dependent signal will not be mitigated thus disturbing the reference signal. In other words, if the running average of averager 117 extends over too few bauds, the S/N ratio of the reference signal is low. On the other hand, if too many bauds are averaged, the S/N ratio of the reference signal is high and if MP changes during this averaging period, the averager response is greatly distorted—this compromises the performance of the adaptive equalizer which uses the averager to estimate the RF channel's characteristics. Thus, the average is taken over from about 40–70 bauds in certain embodiments of this invention.

The contents of the averager memory 117 are directly used to determine the tap weight updates for equalizer 113 via the LMS algorithm at station 118. The contents of averager memory 117 after being matched filtered at 151 are further used to determine the baud clock or baseband frequency adjustment via controller 111, and the carrier frequency adjustment via local oscillator 103.

Figure 21A:
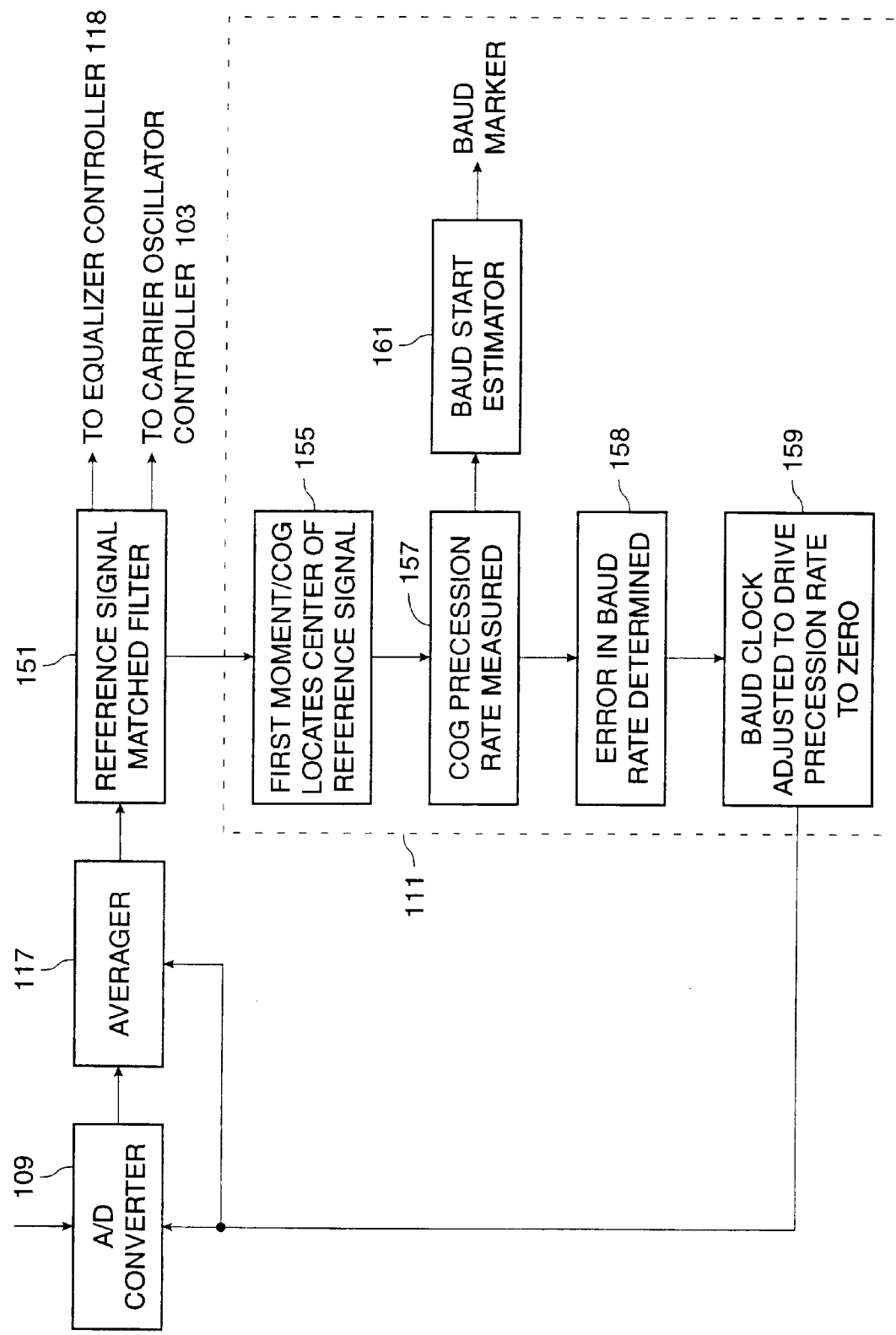
FIG. 21(a) is a block diagram/flowchart of the baud clock controller of the receiver for the first embodiment illustrated in FIG. 20.
Figure 21B:
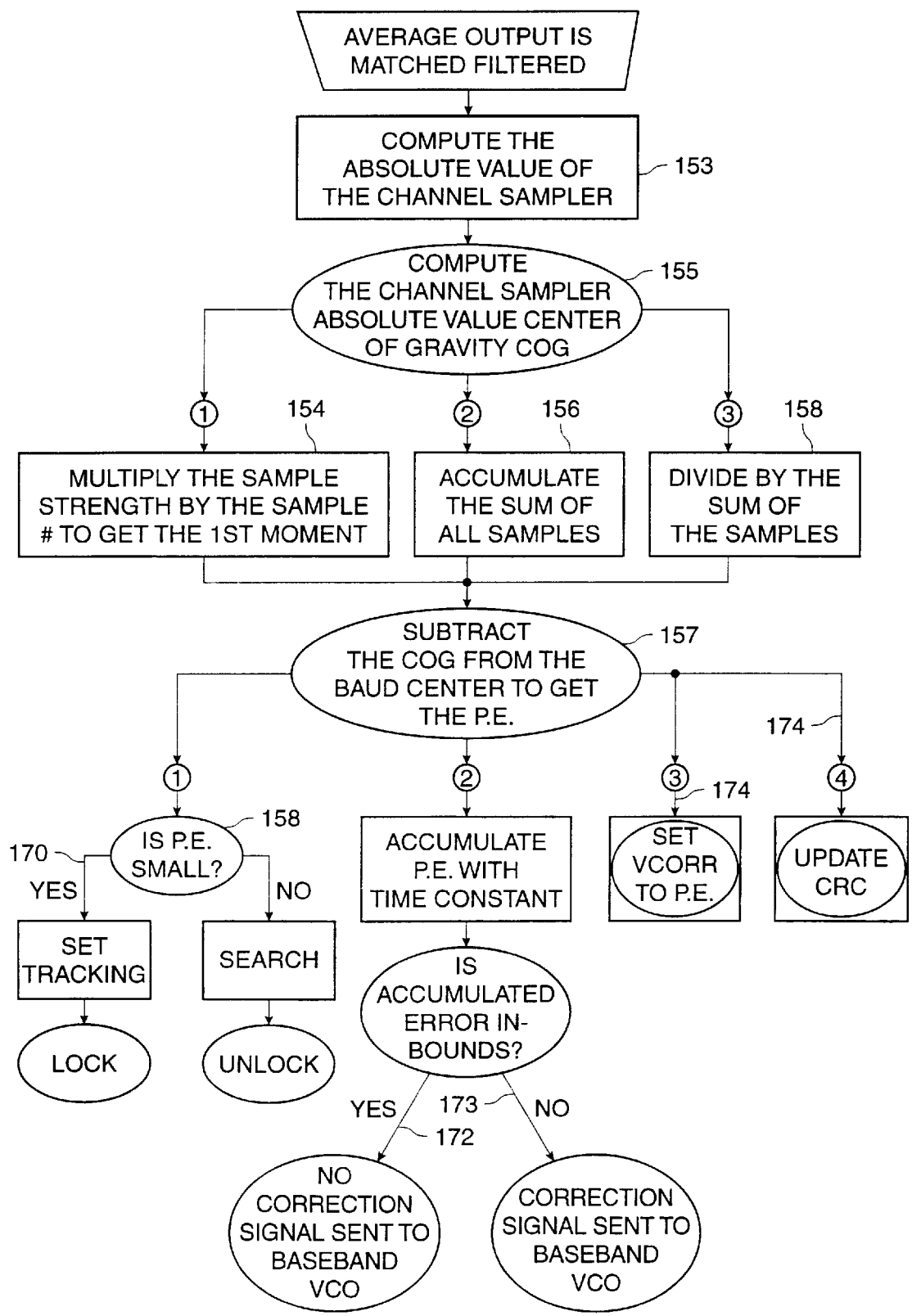
FIG. 21(b) is a flowchart for the baud clock controller of FIG. 21(a).
Figure 21C:
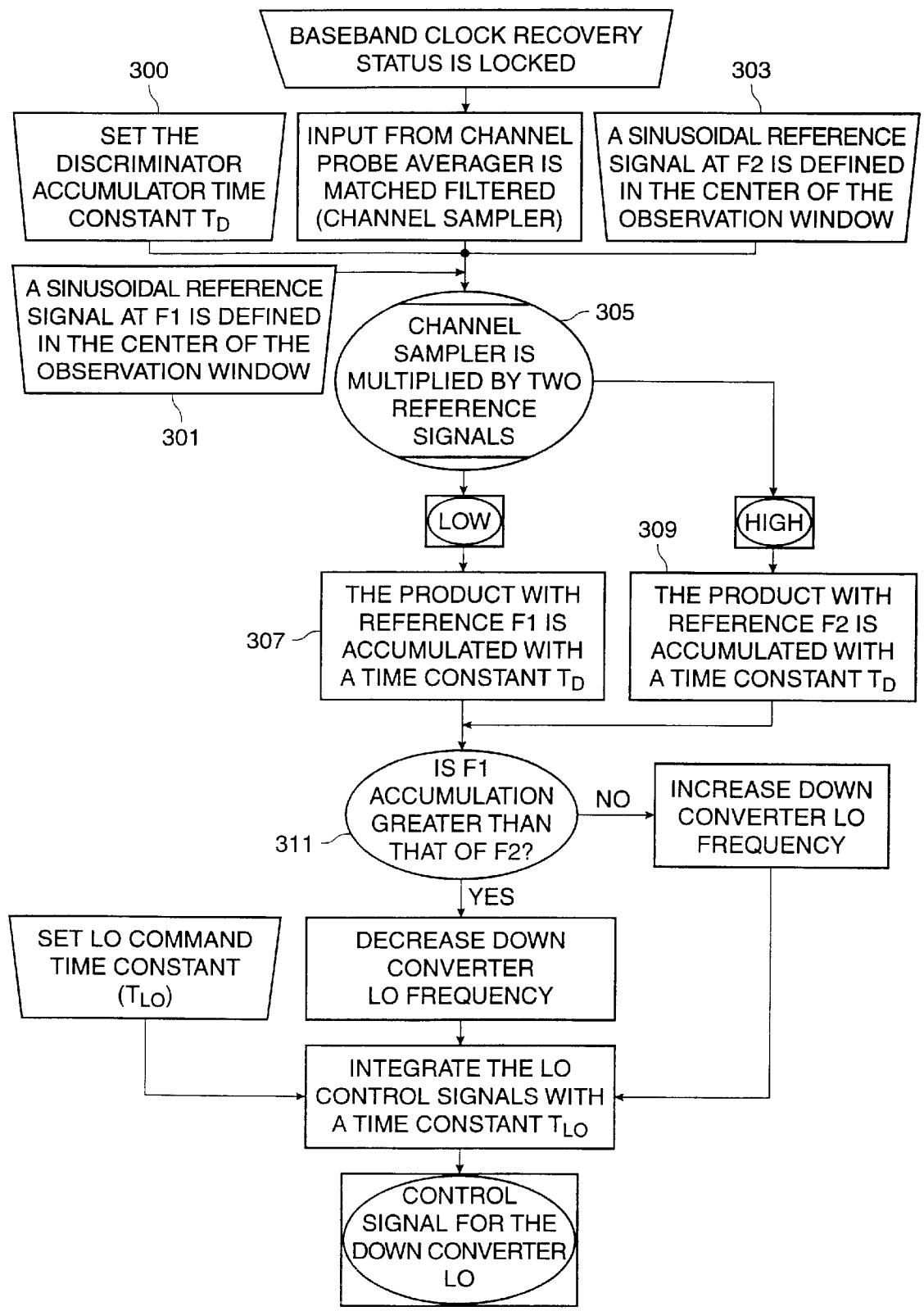
FIG. 21(c) is a flowchart illustrating the steps taken for carrier clock recovery in the receiver illustrated in FIG. 20.
Figure 21D:
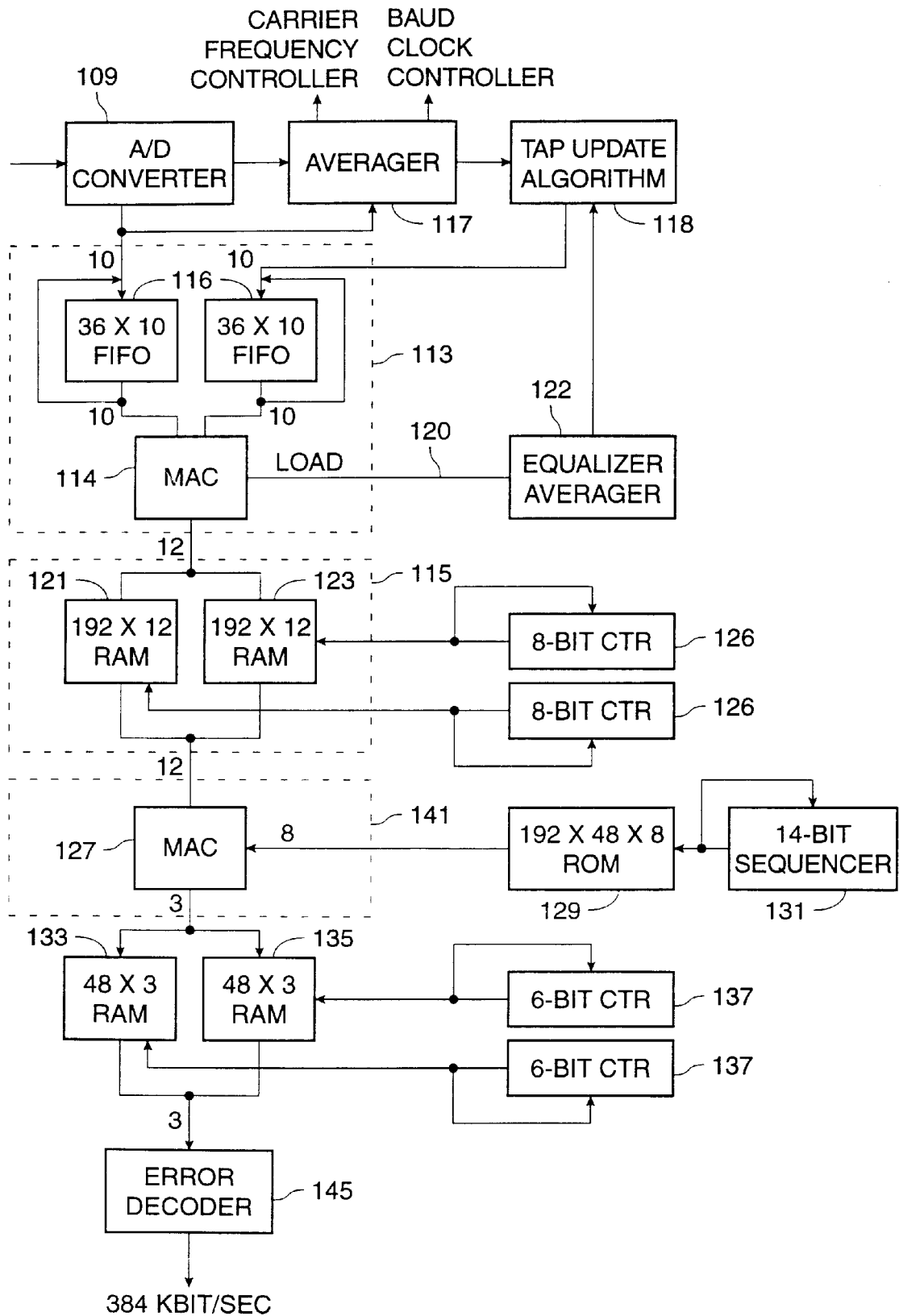
FIG. 21(d) is a block diagram of certain signal processing units of the receiver depicted in FIG. 20 according to a particular hardware embodiment of this invention.

With respect to what algorithm is used at station 118 to control equalizer 113, a first embodiment uses the Levinson-Durbin algorithm while the embodiment illustrated in FIG. 21(d) uses LMS. Alternatively, the Recursive Least Squares alogorithm may be instead used.

The baud clock frequency adjustment (also known as the baseband clock recovery) is shown in FIGS. 20, 21(a), 21(b), and 21(d). The baud clock frequency adjustment controls the 1536 MHz. A/D converter 109 sample rate via controller 111. When divided by 8, as with a 3-bit toggle counter, this frequency is also the fundamental 384 kilohertz bit clock.

The carrier clock frequency adjustment controls oscillator 103 via frequency error measurer 116. Both oscillators, 103 and 111, may be implemented with direct-digital synthesis (DDS) hardware units such as Qualcomm Q2334 DDS or alternatively with phase locked loop synthesizers. It is noted at this time that there is no implied phase coherence between the carrier clock and the baud clock—any such coherence that might exist at the transmitter is eliminated by Doppler frequency variation and the like.

Referring again to FIG. 21(d), the equalized digital samples are loaded into one of two 192-element RAMs 121 and 123, each RAM having a 12-bit width, the loading alternating from one baud to the next baud. This is required so that the contents of one of RAMs 121 and 123 reflecting the entire previous baud may be processed undisturbed as the equalized samples from the current baud are being gathered. Hence, RAMs 121 and 123 operate in a "ping-pong" manner with a latency of one full baud. RAMs 121 and 123 of FIFO buffer 115 are triggered by 8-bit counters 126.

The processing required is the correlation of the equalized samples for a complete baud with each of the 48 modulated waveforms making up the 48 carriers of the baud set. This processing is accomplished with MAC hardware unit 127. The throughput of MAC 127 must be such that 192×48 MACs are completed in the interval of one baud, this interval being about 125 microseconds ($\mu$s) in certain embodiments. Again, MAC 127 alternatively may be implemented with multiple hardware units to achieve higher throughput. RAMs 121 and 123 are implemented within FIFO buffer 115 shown in FIG. 20.

Correlation with the 48 different sequences or waveforms of each baud is implemented via MAC 127 and ROM 129. The 48 basis waveforms in each baud are stored end-to-end and organized in ROM 129 which has an 8-bit width, the address generator 131 for ROM 129 being 14-bit modulo 192×48 counter 131. Thus, ROM 129 is essentially a basis sequence or waveform generator disposed within the receiver.

MAC 127 multiplies the samples of each baud pairwise by each of the 48 sequences, and then adds them up. At the start of each baud, MAC unit 127 (which makes up multiplier 141 and comparator 143) is clocked 192 times to accumulate the correlation of the previous baud with the first waveform output (e.g. Channel 1 carrier) from ROM 129. Thereafter, MAC 127 determines the binary value of the Channel 1 carrier (i.e. 0 or 1). In other words, the basis Channel 1 waveform is emitted from ROM 129 and multiplied with the composite baud digital signal output from RAMs 121 and/or 123 in order to obtain the modulated Channel 1 carrier.

This sample is then rounded to 3-bit precision and directed toward one of two 48-sample RAMs 133 and 135, each with a 3-bit width. At this point, ROM address counter 131 will select the first sample of the next basis waveform from ROM 129 (i.e. Channel 2), and MAC 127 is cleared to prepare for the next correlation accumulation. This process is repeated for the remaining 47 waveforms or sequences within the set making up one baud, each resulting sample being sent to RAMs 133 and 135.

The 3-bit width on the digital output in RAMs 133 and 135 is only needed for soft-decision Viterbi error decoding. If only Reed-Solomon is used for example, the path need only be one (1) bit wide.

The 48-element RAMs 133 and 135 are organized in a ping-pong manner just as the equalized baud sample RAMS 121 and 123 are. New bit samples are written to one of RAMs 133 and 135 while the alternate RAM is being read by external error decoding hardware 145, such error decoding hardware 145 being conventional Viterbi convolutional and/or Reed-Solomon block decoding hardware and algorithms. Because the binary value of each waveform or channel is determined by MAC 127, the digital data stream output of RAMs 133 and 135 is sent to error protection decoder 145 and then to a MUSICAM decoder including a descrambler, after which it is conventional digital audio data which may be reproduced as music or the like.

The roles of RAMs 133 and 135 are alternated from baud to baud in order to allow the previous baud correlation output bit stream to be read at a uniform rate while the correlation sums are produced at the MAC 127 output operand. RAMs 133 and 135 as shown are indexed by address generators implemented with 6-bit modulo forty-eight counters 137.

Thus, multiplier and integrater unit 141 and comparator 143 made up by MAC 127, and RAMs 133 and 135 simply form a correlation-type detector which reproduces bit patterns as previously encoded at the transmitter. FIGS. 21(a) and 21(b) are block diagram/flowcharts of the system utilized for controlling the baseband (or baud) of A/D converter 109 via controller 111. This system functions to establish the proper frequency of operation for the sample clock voltage controlled oscillator (VCO) in controller 111 for A/D converter 109 which must be substantially synchronous with the baud clock in the transmitter. This baud clock recovery system illustrated in FIGS. 21(a) and 21(b) also functions to establish A/D sample synchronization so that the true first sample of the baud is the first sample that is written into RAMs 121 and 123 which are used to perform the matched filter correlations with MAC 127.

Once the proper frequency is established, every 192 samples in the first embodiment will correspond to a baud. The "baud marker" indicates which one of every 192 samples corresponds to the first sample in the baud. They may be termed control signals which act to clear 8-bit counters 126.

The baud clock in controller 111 is adjusted to have the same frequency as that in the transmitter so that the data emerging from the receiver is synchronous with the transmitter data. When the number of samples per baud and the baud clock (or baseband frequency) are correct, the reference signal timing relative to the start of the baud signal will not change. Therefore, the baud clock frequency is adjusted to make the-reference signal frequency the same as in the transmitter so the reference signal does not move relative to the baud marker. The receiver baud marker is correctly timed relative to the incoming bauds to minimize the error rate. Further, when the reference signal does not substantially move from baud to baud, equalizer 113 can correctly position the reference signal to meet its timing requirement and compensate for multipath.

The digitized signal is sent from A/D converter 109 to averager 117. In averager 117, the data from the incoming bauds is added on a sample by sample basis with the running average of previous bauds. The data averages out thus leaving the reference signal. Averager 117 extracts the reference signal from the digital signal forwarded by converter 109 thus allowing averager 117 to provide a running average of the distorted reference signal. The signal to noise ratio of the reference signal (or channel probe) is then maximized by matched filter 151. After being match filtered, the reference signal is forwarded to both baud clock controller 111 and frequency controlled oscillator 103 so as to allow the frequencies of these voltage controlled oscillators to be controlled.

With respect to controller 111, a moving receiver or moving multipath causes the received FM/digital signal to be Doppler shifted thus changing the timing of the baud(s). However, multipath does not materially impact the sampling clock frequency although it does distort the timing. Controller 111 and the baud clock therewithin function to hold the frequency substantially constant so as to allow equalizer 113 to adjust the data signal (and reference signal) with respect to phase.

The reference signal should be in the same frequency band as the data to be an effective measure of the channel. The reference signal SNR at the receiver is increased through averager 117 because the reference signal is constant from baud to baud while noise and the data modulation is random Hence, the reference will coherently add while the random perturbations will tend to cancel each other out in the averager. Therefore, it is possible to operate the reference signal at a lower transmitter power level.

The reference signal is designed so that its position in each baud can be measured. The processed output after averager 117 and filter 151 has a sharp peak often in the approximate center of each baud. Because averager 117 coherently adds the reference signal and incoherently adds the data, the S/N ratio of the reference signal is increased and the filtered version has a desired shape with a localized amplitude.

Controller 111 tracks the frequency of the filtered reference signal as opposed to its phase. It is thus blind to multipath distortion and immune to MP induced search caused by phase tracking.

The frequency sensitive tracking of controller 111 keeps the position of the reference signal constant and allows equalizer 113 to reposition the reference signal. MP distorts the reference signal thus causing the position of the largest amplitude from filter 151 to move accordingly. Controller 111 measures the reference signal center of gravity (COG) as a means for measuring and computing the precession of the reference signal relative to the baud start sample.

The absolute value of the matched filtered reference signal is taken in step 153 (see FIG. 21(b)) to establish an approximate reference signal envelope and multiplied by the time interval from the point where the baud was assumed to begin in step 154. In other words, multiplying the sample amplitude by the same number in step 154 relative to the first sample in the baud produces a first moment. The products for all samples are added together in step 156 and divided by the sum of the samples in step 158 to compute the reference signal absolute value center of gravity (see step 155). Because the first moment for the matched filtered averager output has the same characteristics as a center of gravity (COG) calculation, the COG technique is used for locating the effective center of the distorted reference signal in step 155. Thus, the COG is a good way in which to compute the precession of the reference signal relative to the baud start sample.

If the baud frequency is correct, variations in distortion will cause the COG location to oscillate, but will not cause it to precess. Doppler shift of the incoming signal and baud clock frequency differences between the transmitter and receiver do, however, cause precession. The effective error in the baud rate frequency is determined by measuring the rate of precession of the COG location in step 157 by subtracting the COG from the baud center. The COG for a correctly timed and MP-free reference signal is computed when the receiver is calibrated.

The rate of change of difference between the channel sampler or reference signal COG and the ideal COG is called the position error (PE). The rate of change of PE is a measure of the sample clock or baud clock frequency error.

Thus, by determining the position error (PE) of the COG in step 157, baud clock frequency offsets and Doppler shifts are simultaneously eliminated by adjusting the baud clock frequency in step 159 via controller 111 to drive the precession rate to substantially zero. By determining via frequency measurement the error amount in the baud rate in step 158, steps 170–174 adjust the voltage controlled oscillator in controller 111. If the average indicates that the frequency is too high, a lower VCO control voltage is issued to the sample clock in step 159, and if the average indicates that the frequency is too low, an increase in the VCO control voltatage is issued.

If the PE is small, the oscillator is not adjusted (step 170) in certain embodiments. However, if there is substantial PE of the COG, step 171 is carried out to determine the extent of the error. If it is "in bounds" (or within plus or minus about 4 samples) so that equalizer 173 can handle it, no correction signal is sent to the baseband oscillator (step 172). However, if the PE is out of bounds (i.e. more than plus or minus 4 samples difference between the true baud center and the center as set through the PE algorithm), a correction signal is sent to the oscillator in step 173, and correction is carried out in steps 174 via adjusting the baud clock voltage controlled oscillator.

It is noted that the COG is also utilized to calculate where each baud began using baud start estimator 161 thus producing the baud marker. The baud marker is a pulse which is output every 192 samples. 14-bit sequencer 131 and counters 126 (see FIG. 21(*d*)) both receive the baud marker pulse in order to ensure synchronization.

As discussed above, the output of averager 117 and matched filter 151 is also utilized to ensure correct operation of oscillator 103 thereby providing proper carrier clock frequency. FIG. 21(*c*) is a self-explanatory flowchart of the system for controlling oscillator 103 via the matched filter reference signal output from filter 151. The baseband and carrier frequencies must be controlled by different oscillators because Doppler affects the baud clock and carrier clock to different extents. LO 103 is adjusted as follows so the IF center frequency in the receiver is the same as in the transmitter.

The carrier clock recovery system tracks multipath induces IF center frequency phase changes. The reference signal need be in the same frequency band as the data to be an effective measure of MP distorting.

The reference signal is designed with a center frequency near (within about 1%) the data signal center frequency so that setting the reference signal center frequency is substantially equivalent to setting the frequency of the data. The IF center frequency is chosen in certain embodiments as an even harmonic of the baud rate so that the phase of the IF carrier with correct frequency rotates an integer ×360° in one baud period thereby allowing the receiver to interpret phase rotation of reference signal as an IF frequency error. A frequency sensitive tracking loop keeps the phase of the reference signal constant thereby allowing equalizer 113 to reset the phase of the reference signal and along therewith the phase of the digital data signal.

As shown, time constant $T_d$ is defined in step 300 as about 100 times the baud period and truncated and frequency shifted replicas F1 and F2 of the channel sampler are generated in steps 301 and 303, the channel sampler being the triangularly shaped weighted cosine wave output from matched filter 151.

F1 is a frequency about 0.01% below the ideal IF truncated to about 10% of the baud while F2 is a frequency about 0.01% above the ideal IF truncated to about 10% of the baud. F1 and F2 are truncated in such a manner because the reference signal is only large near the center of the baud.

F1 is multiplied by the channel sampler on a sample by sample basis with the products summed in step 305. The sum of products is subtracted from the value computed on the previous baud. The difference represents baud to baud change and frequency F1 error. This F1 error is accumulated in step 307 over several hundred bauds to get a running average F1 error. The F2 running average error is determined in steps 305 and 309 in the same manner. In step 311, if the F1 accumulation is equal to the F2 accumulation, LO 103 is not adjusted. However, if F1 accumulation is greater than that of F2, the oscillator frequency is increased. The opposite is true if F2 is less than F1.

The above described first embodiment in which a composite signal, including an analog FM portion and a digital portion is transmitted, is exemplary of this invention. It is not intended to limit the scope of the digital data transmission system to the first embodiment of this invention. For example, the digital data of the first embodiment of this invention could be transmitted alone without linear summing with the analog FM signal in various environments, thereby providing simple digital data transmission from one point to another through atmospheric free space. Such digital data transmission is useful in systems such as wireless LANs, microwave digital communication systems, cellular telephone systems, etc.

An exemplary embodiment would be the transmission of a two-lobed digital signal as described herein in an environment having known colored interference at a particular frequency. The basis set may be spectrally shaped in such a case so that the two lobes surround the frequency at which the interference (e.g. conventional microwave interference) is present.

Additionally, the basis set of orthogonal waveforms output from generator 37 need not be spectrally shaped into two separate and spaced apart lobe or passband portion; instead, the waveforms may be shaped into a single lobe portion containing substantially all of the digital data to be transmitted. Such spectral shaping would be advantageous in environments not having interference such as the above mentioned analog FM signal of the first embodiment or any other type of colored interference.

Additionally, dynamic interference cancelling may be utilized in certain embodiments so as to filter out specific portions of the received signal in environments having strong colored intereference. Such interference cancelling filters may be implemented following equalizer 113 or alternatively as part of equalizer 113. The taps of equalizer 113 may be programmed in such a manner that the equalizer itself filters out the colored interference.

APPENDIX A

RANDOM NUMBER FUNCTION #1

```
       FUNCTION RAN3(IDUM)
           Returns a uniform random deviate between 0.0 and 1.0. Set IDUM to any negative value
           to initialize or reinitialize the sequence.
0          IMPLICIT REAL*4(M)
0          PARAMETER (MBIG=4000000.,MSEED=1618033.,MZ=0.,FAC=1./MBIG)
```

APPENDIX A-continued

```
PARAMETER (MBIG=1000000000,MSEED=161803398,MZ=0,FAC=1./MBIG)
    According to Knuth, any large MBIG, and any smaller (but still large) MSEED can be sub-
    stituted for the above values.
DIMENSION MA(55)                      This value is special and should not be modified; see Knuth.
DATA IFF /O/
IF(IDUM.LT.O.OR.IFF.EQ.O)THEN            initialization.
    IFF=1
    MJ=MSEED-IABS(IDUM)                Initialize MA(55) using the seed IDUM and the large numbered MSEED
    MJ=MOD(MJ,MBIG)
    MA(55)=MJ
    MK=1
    DO 11 I=1.54                       Now initialize the rest of the table.

II=MOD(21*I,55)                in a slightly random order.
        MA(II)=MK                      with numbers that are not especially random.
        MK=MJ-MK
        IF(MK.LT.MZ)MK=MK+MBIG
        MJ=MA(II)
        11 CONTINUE DO 13 K=1,4                        We randomize them by "warming up the generator."

DO 12 I=1,55

MA(I)=MA(I)-MA(1+MOD(I+30,55))
            IF(MA(I).LT.MZ)MA(I)=MA(I)+MBIG
            12 CONTINUE

13 CONTINUE

INEXT=0                            Prepare indices for our first generated number.
    INEXTP=31                          The constant 31 is special; see Knuth.
    IDUM=1
ENDIF
INEXT=INEXT+1                          Here is where we start, except on initialization. Increment INEXT,
IF(INEXT.EQ.56)INEXT=1                     wrapping aroud 56 to 1.
INEXTP=INEXTP+1                        Ditto for INEXTP.
IF(INEXTP.EQ.56)INEXTP=1
MJ=MA(INEXT)-MA(INEXTP)                Now generate a new random number subtractively.
IF(MJ.LT.MZ)MJ=MJ+MBIG                 Be sure that it is in range.
MA(INEXT)=MJ                           Store it,
RAN3=MJ*FAC                            and output the derived uniform deviate.
RETURN
END
```

RANDOM NUMBER FUNCTION #2

```
FUNCTION RAN1(IDUM)
    Returns a uniform random deviate between 0.0 and 1.0. Set IDUM to any negative value
    to initialize or reinitialize the sequence.
DIMENSION R(97)
PARAMETER (M1=259200,IA1=7141,IC1=54773,RM1=1./M1)
PARAMETER (M2=134456,IA2=8121,IC2=28411,RM2=1./M2)
PARAMETER (M3=243000,IA3=4561,IC3=51349)
DATA IFF /O/                           As above, initialize on first call even if IDUM is not negative.
IF (IDUM.LT.O.OR.IFF.EQ.O) THEN
    IFF=1
    IX1=MOD(IC1-IDUM,M1)               See the first routine;
    IX1=MOD(IA1*IX1+IC1,M1)
    IX2=MOD(IX1,M2)                    and use it to seed the second
    IX1=MOD(IA1*IX1+IC1,M1)
    IX3=MOD(IX1,M3)                    and third routines.
    DO 11 J=1.97                       Fill the table with sequential uniform deviates generated by the first IX1=MOD(IA1*IZ1+IC1,M1)        two routines.
        IX2=MOD(IA2*IX2+IC2,M2)
        R(J)=(FLOAT(IX1)+FLOAT(IX2)*RM2)*RM1    Low- and high-order pieces combined here.
        11 CONTINUE IDUM=1
ENDIF
IX1=MOD(IA1*IX1+IC1,M1)                Except when initializing, this is where we start. Generate the next
IX2=MOD(IA2*IX2+IC2,M2)                    number for each sequence.
IX3=MOD(IA3*IX3+IC3,M3)
J=1+(97*IX3)/M3                        Use the third sequence to get an integer between 1 and 97.
IF(J.GT.97.OR.J.LT.1)PAUSE
RAN1=R(J)                              Return that table entry,
R(J)=(FLOAT(IX1)+FLOAT(IX2)*RM2)*RM1   and refil it.
RETURN
END
```

APPENDIX B $$A = U \cdot \begin{pmatrix} \omega_1 & & & & \\ & \omega_2 & & & \\ & & \ldots & & \\ & & & \ldots & \\ & & & & \omega_N \end{pmatrix} \cdot V^T$$

APPENDIX C

SVD Algorithm

```
SUBROUTINE SVDCMP(A,M,N,MP,NP,W,V)
    Given a matrix A, with logical demensions M by N and physical
    dimensions MP by NP, this routine computes its singular value
    decomposition, A = U · W · V^T. The matrix U replaces
    A on output. The diagonal matrix of singular values W is
    output as a vector W. The matrix V (not the transpose V^T)
    is output as V. M must be greater or equal to N; if it is
    smaller, then A should be filled up to square with zero rows.
PARAMETER (NMAX=100)         Maximum anticipated value of N.
DIMENSION A(MP,NP),W(NP),V(NP,NP),RV1(NMAX)
IF(M.LT.N)PAUSE 'You must augment A with extra zero rows.'
    Householder reduction to bidiagonal form.
G=0.0
SCALE=0.0
ANORM=0.0
DO 25 I=1,N
    L=I+1
    RV1(I)=SCALE*G
    G=0.0
    S=0.0
    SCALE=0.0
    IF (I.LE.M) THEN
        DO 11 K=I,M
            SCALE=SCALE+ABS(A(K,I))
        11 CONTINUE
        IF (SCALE.NE.0.0) THEN
            DO 12 K=I,M
                A(K,I)=A(K,I)/SCALE
                S=S+A(K,I)*A(K,I)
            12 CONTINUE
            F=A(I,I)
            G=-SIGN(SQRT(S),F)
            H=F*G-S
            A(I,I)=F-G
            IF (I.NE.N) THEN
                DO 15 J=L,N
                    S=0.0
                    DO 13 K=I,M
                        S=S+A(K,I)*A(K,J)
                    13 CONTINUE
                    F=S/H
                    DO 14 K=I,M
                        A(K,J)=A(K,J)+F*A(K,I)
                    14 CONTINUE
                15 CONTINUE
            ENDIF
            DO 16 K= I,M
                A(K,I)=SCALE*A(K,I)
            16 CONTINUE
        ENDIF
    ENDIF
```

APPENDIX C-continued

SVD Algorithm

```
    W(I)=SCALE *G
    G=0.0
    S=0.0
    SCALE=0.0
    IF (FILE,M).AND.(I.NE.N)) THEN
        DO 17 K=L,N
            SCALE=SCALE+ABS(A(I,K))
        17 CONTINUE
        IF (SCALE.NE.0.0) THEN
            DO 18 K=L,N
                A(I,K)=A(I,K)/SCALE
                S=S+A(I,K)*A(I,K)
            18 CONTINUE
            F=A(I,L)
            G=-SIGN(SQRT(S),F)
            H=F*G-S
            A(I,L)=F-G
            DO 19 K=L,N
                RV1(K)=A(I,K)/H
            19 CONTINUE
            IF (I.NE.M) THEN
                DO 23 J=L,M
                    S=0.0
                    DO 21 K=L,N
                        S=S+A(J,J)*A(I,K)
                    21 CONTINUE
                    DO 22 K=L,N
                        A(J,K)=A(J,K)+S*RV1(K)
                    22 CONTINUE
                23 CONTINUE
            ENDIF
            DO 24 K=L,N
                A(I,K)=SCALE*A(I,K)
            24 CONTINUE
        ENDIF
    ENDIF
    ANORM=MAX(ANORM,(ABS(W(I))+ABS(RV1(I))))
25 CONTINUE
    Accumulation of right-hand transformations.
DO 32 I=N,1,-1
    IF (I.LT.N) THEN
        IF (G.NE.0.0) THEN
            DO 26 J=L,N              Double division to avoid possible
                V(J,I)=(A(I,J)/A(I,L))/G                      underflow.
            26 CONTINUE
            DO 29 J=L,N
                S=0.0
                DO 27 K=L,N
                    S=S+A(I,K)*V(K,J)
                27 CONTINUE
                DO 28 K=L,N
                    V(K,J)=V(K,J)+S*V(K,I)
                28 CONTINUE
            29 CONTINUE
        ENDIF
```

APPENDIX C-continued

SVD Algorithm

```
            DO 31 J=L,N
                V(I,J)=0.0
                V(J,I)=0.0
            31 CONTINUE
        ENDIF
        V(I,I)=1.0
        G=RV1(I)
        L=I
    32 CONTINUE
    Accumulation of left-hand transformations.
    DO 39 I=N,1,-1
        L=I+1
        G=W(I)
        IF (I.LT.N) THEN
            DO 33 J=L,N
                A(I,J)=0.0
            33 CONTINUE
        ENDIF
        IF (G.NE.0.0) THEN
            G=1.0/G
            IF (I.NE.N) THEN
                DO 36 J=L,N
                    S=0.0
                    DO 34 K=L,M
                        S=S+A(K,I)*A(K,J)
                    34 CONTINUE
                    F=(S/A(I,I))*G
                    DO 35 K=I,M
                        A(K,J)=A(K,J)+F*A(K,I)
                    35 CONTINUE
                36 CONTINUE
            ENDIF
            DO 37 J=I,M
                A(J,I)=A(J,I)*G
            37 CONTINUE
        ELSE
            DO 38 J= I,M
                A(J,I)=0.0
            38 CONTINUE
        ENDIF
        A(I,I)=A(I,I)+1.0
    39 CONTINUE
    Diagonalization of the the bidiagonal form.
    DO 49 K=N,1,-1     Loop over singular values.
        DO 48 ITS=1,30  Loop over allowed iterations.
            DO 41 L=K,1,-1   Test for splitting.
                NM=L-1          Note that RV1(1)is always zero.
                IF ((ABS(RV1(L))+ANORM).EQ.ANORM)
                    GO TO 2
                IF ((ABS(W(NM)+ANORM).EQ.ANORM)
                    GO TO 1
            41 CONTINUE
1           C=0.0           Cancellation of RV1(L),if L> 1
            S=1.0
            DO 43 I=L,K
                F=S*RV1(I)
                IF ((ABS(F)+ANORM).NE.ANORM) THEN
                    G=W(I)
                    H=SQRT(F*F+G*G)
                    W(I)=H
                    H=1.0/H
                    C= (G*H)
                    S=-(F*H)
                    DO 42 J=1,M
                        Y=A(J,NM)
                        Z=A(J,I)
                        A(J,NM)=(Y*C)+(Z*S)
                        A(J,I)=-(Y*S)+(Z*C)
                    42 CONTINUE
                ENDIF
            43 CONTINUE
2           Z=W(K)
            IF (L.EQ.K) THEN     Convergence.
                IF (Z,LT.0.0) THEN   Singular value is made non-
                    W(K)=-Z                                negative.
                    DO 44 J=1,N
                        V(J,K)=-V(J,K)
                    44 CONTINUE
                ENDIF
                GO TO 3
            ENDIF
            IF (ITS.EQ.30) PAUSE 'No convergence in 30 iterations'
            X=W(L)          Shift from bottom 2-by-2 minor.
            NM=K-1
            Y=W(NM)
            G=RV1(NM)
            H=RV1(K)
            F=((Y-Z)*(Y+Z)+(G-H)*(G+H))/(2.0*H*Y)
            G=SQRT(F*F+1.0)
            F=((X-Z)*(X+Z)+H*((Y/(F+SIGN(G,F)))-H))/X
        Next QR transformation.
            C=1.0
            S=1.0
            DO 47 J=L,NM
                I=J+1
                G=RV1(I)
                Y=W(I)
                H=S*G
                G=C*G
                Z=SQRT(F*F+H*H)
                RV1(J)=Z
                C=F/Z
                S=H/Z
                F= (X*C)+(G*S)
                G=-(X*S)+(G*C)
                H=Y*S
                Y=Y*C
                DO 45 NM=1,N
                    X=V(NM,J)
                    Z=V(NM,I)
                    V(NM,J)= (X*C)+(Z*S)
                    V(NM,I)=-(X*S)+(Z*C)
                45 CONTINUE
                Z=SQRT(F*F+H*H)
                W(J)=Z          Rotation can be array if Z=0.
                IF (Z.NE.0.0) THEN
                    Z=1.0/Z
                    C=F*Z
                    S=H*Z
                ENDIF
                F= (C*G)+(S*Y)
                X=-(S*G)+(C*Y)
                DO 46 NM=1,M
                    Y=A(NM,J)
                    Z=A(NM,I)
```

APPENDIX C-continued

SVD Algorithm

```
        A(NM,J)= (Y*C)+(Z*S)
        A(NM,I)=-(Y*S)+(Z*C)
        46 CONTINUE
     47 CONTINUE
        RV1(L)=0.0
        RV1(K)=F
        W(K)=X
        48 CONTINUE
3    CONTINUE
     49 CONTINUE
     RETURN
     END
```

Once given the above disclosure many other features, modifications and improvements will become apparent to the skilled artisan. Such other features, modifications, and improvements are, therefore, considered to be a part of this invention, the scope of which is to be determined by the following claims:

We claim:

1. A method of simultaneously transmitting an analog FM signal and a digitized wideband signal robust to multipath degradation and intersymbol interference within a predetermined broadcast band, the method comprising the steps of:
   a) producing the analog FM signal substantially centered about a center frequency of a predetermined broadcast band;
   b) generating a basis set of wideband mutually orthogonal pseudorandom basis signal waveforms of substantially equal length and having predetermined autocorrelation values and a predetermined spectral shape, the length of the waveforms in the set representing a baud, said predetermined spectral shape of the basis waveforms in the basis set including two spaced apart sections, one on each side of the center frequency;
   c) data modulating the wideband waveforms of the basis set so as to define digital data, the basis set substantially maintaining said predetermined spectral shape during said modulation;
   d) linearly combining the analog FM signal and the modulated waveforms to produce a composite signal; and
   e) transmitting the composite signal through atmospheric free-space to at least one receiver.

2. The method of claim 1, including the step of:
defining the digital data by variable gain modulating the waveforms so that predetermined autocorrelation and orthogonal characteristics of the spectrally shaped and modulated waveforms are substantially maintained through said modulation.

3. The method of claim 2, including the step of:
variable gain modulating the waveform by phase modulation, and said step b) including generating said basis set so as to have a crosscorrelation/autocorrelation ratio of less than about 0.001.

4. The method of claim 1, including the step of:
spacing the sections of the mutually orthogonal spectrally shaped and modulated set of waveforms from about 50 kHz to about 150 kHz from the center frequency, and maintaining the predetermined autocorrelation values to maintain a crosscorrelation/autocorrelation ratio of said set to be less than about 0.002 for each waveform pair.

5. The method of claim 4, including the step of:
utilizing the waveforms as digital carriers having a maximum amplitude at least about 20 dB below that of the FM signal.

6. The method of claim 5, including the steps of:
positioning the sections substantially symmetrically about the center frequency, the sections being spaced from about 75 kHz to 125 kHz from the center frequency;
forming the sections so that the maximum amplitude of the waveforms is at least about 25 dB below that of the FM signal; and
forming said set so as to have a crosscorrelation/autocorrelation ratio of less than about 0.001 for each waveform pair.

7. The method of claim 1, including the step of:
forming the set of wideband mutually orthogonal spectrally shaped basis signal waveforms by:
   i) generating a plurality of pseudorandom sequences having at least about 50 samples per sequence;
   ii) spectrally shaping each of the generated pseudorandom sequences into the two spaced apart sections by convolving each pseudorandom sequence with a shaping function so that the resulting spectrally shaped pseudorandom sequences have predetermined autocorrelation properties;
   iii) arranging the shaped pseudorandom sequences as columns of a matrix, the matrix having a greater number of rows than columns, the number of columns of said matrix substantially representing the number of pseudorandom spectrally shaped sequences, and the number of rows substantially representing the number of samples in sequence; and
   iv) decomposing the matrix by singular value decomposition into the product of three other matrices so that a substantial number of the columns of one of the other matrices represents the basis set of spectrally shaped orthogonal sequences.

8. The method of claim 7, including the step of:
determining the maximum length of each pseudorandom sequence by the ratio of the baud interval to the sample interval.

9. A transmitter for broadcasting a signal including an analog FM signal portion and a digital signal portion robust to multipath degradation, the transmitter comprising:
   means for generating the analog FM signal substantially centered about the center frequency of a predetermined broadcast band;
   means for generating a basis wideband set of substantially orthogonal spectrally shaped pseudorandom waveforms having predetermined autocorrelation properties, the basis waveforms being spectrally shaped so as to define a first portion on one side of the center frequency within the broadcast band and a second portion on an opposite side of the center frequency within the broadcast band so that the analog FM signal may be disposed substantially between the first and second portions of the spectrally shaped waveforms;
   modulation means for digitally modulating the basis set of spectrally shaped substantially orthogonal wideband waveforms to define the digital signals, the modulated waveforms maintaining their spectral shaping through the modulation;
   means for combining the analog FM and digital signals to form a composite signal; and
   broadcast means for transmitting the composite signal to at least one receiver.

10. The transmitter of claim 9, wherein said means for generating said basis set spaces the first and second spectrally shaped portions of the set of digitally modulated wideband waveforms from about 50 kHz–200 kHz away from the center frequency, and sets the maximum amplitude of the digital signals at least about 20 dB below that of the FM signal centered about the center frequency.

11. The transmitter of claim 10, wherein the predetermined broadcast band extends less than about 350 kHz on either side of the center frequency, and the composite signal is substantially disposed within the broadcast band, and wherein said set has a crosscorrelation/autocorrelation ratio of less than about 0.001.

12. The transmitter of claim 9, wherein said means for generating a wideband set determines the basis wideband set of substantially orthogonal spectrally shaped pseudorandom waveforms by:
 a) generating a plurality of random number wideband pseudorandom sequences via a plurality of samples;
 b) spectrally shaping each of the generated pseudorandom sequences into the first and second portions disposed on opposite sides of the center frequency;
 c) arranging the shaped pseudorandom sequences as columns of a matrix, the matrix having a greater number of rows than columns;
 d) decomposing the matrix by singular value decomposition into the product of three additional matrices, wherein a substantial number of the columns of one of the additional matrices represents the basis wideband set of spectrally shaped waveforms.

13. The transmitter of claim 12, wherein said modulation means phase modulates the waveforms of the basis set in order to define the digital signals to be transmitted, and wherein said basis set includes at least about 35 different waveforms, each waveform representing a different channel or carrier.

14. A method for implementing a high spectral efficiency digital communication link in channels with known colored interference and multipath, the method comprising the steps of:
 a) determining the spectral content of the known colored interference;
 b) generating a basis set of wideband mutually orthogonal sequences, said sequences having predetermined autocorrelation characteristics;
 c) spectrally shaping said basis set to complement the colored interference;
 d) setting the baud interval, or length of said sequences, to a value greater than a determined longest expected multipath delay;
 e) data modulating said sequences; and
 f) transmitting said modulated sequences as waveforms over the digital communication link from a transmitter to a receiver.

15. The method fo claim 14, wherein step c) includes spectrally shaping said set into at least two spaced apart portions whereby said colored interference is disposed between said two spaced apart portions so as to allow said digital data to be effectively transmitted in environments having known colored interference.

16. The method of claim 14, further including the step of
 g) summing together a wideband reference signal with said modulated waveforms of said set so that said reference signal is spectrally confined substantially to the extent of the pseudorandom modulated waveforms of said set.

17. The method of claim 16, further including the step of
 h) measuring the frequency of said reference signal in said receiver and accordingly adjusting a baud clock in said receiver so as to ensure data synchronization in said receiver and transmitter.

18. A method of transmitting a digitized wideband signal robust to multipath degradation and intersymbol interference within a predetermined broadcast band, the method comprising:
 generating a basis set of wideband mutually orthogonal pseudorandom basis signal waveforms of substantially equal length and having predetermined autocorrelation values and a predetermined spectral shape, the length of the waveforms in the set representing a baud, the waveforms comprise codes having more than two values, the generating the basis set includes
  a) generating a plurality of random number wideband pseudorandom sequences via a plurality of samples,
  b) spectrally shaping each of the generated pseudorandom sequences into the first and second portions disposed on opposite sides of the center frequency,
  c) arranging the shaped pseudorandom sequences as columns of a matrix, the matrix having a greater number of rows than columns, and
  d) decomposing the matrix by singular value decomposition into the product of three additional matrices, wherein a substantial number of the columns of one of the additional matrices represents the basis wideband set of spectrally shaped waveforms; and
 data modulating the wideband waveforms of the basis set so as to define digital data, the basis set substantially maintaining said predetermined spectral shape during said modulation.

19. The method of claim 18, wherein said modulator phase modulates the waveforms of the basis set in order to define the digital signals to be transmitted, and wherein said basis set includes at least about 35 different waveforms, each waveform representing a different channel or carrier.

* * * * *